United States Patent
Koga

(10) Patent No.: US 10,469,008 B2
(45) Date of Patent: Nov. 5, 2019

(54) ROTARY SOLENOID DRIVE CONTROL METHOD

(71) Applicant: TAKANO CO., LTD., Nagano (JP)

(72) Inventor: Yoshiro Koga, Nagano (JP)

(73) Assignee: TAKANO CO., LTD., Nagano (JP)

( * ) Notice: Subject to any disclaimer, the term of this patent is extended or adjusted under 35 U.S.C. 154(b) by 0 days.

(21) Appl. No.: 16/301,833

(22) PCT Filed: May 16, 2016

(86) PCT No.: PCT/JP2016/064525
§ 371 (c)(1),
(2) Date: Nov. 20, 2018

(87) PCT Pub. No.: WO2017/199313
PCT Pub. Date: Nov. 23, 2017

(65) Prior Publication Data
US 2019/0165706 A1    May 30, 2019

(51) Int. Cl.
*H02P 7/03*     (2016.01)
*H02K 33/16*    (2006.01)
*H02K 26/00*    (2006.01)

(52) U.S. Cl.
CPC .............. *H02P 7/03* (2016.02); *H02K 26/00* (2013.01); *H02K 33/16* (2013.01)

(58) Field of Classification Search
CPC ..... H02P 6/24; H02P 6/30; H02P 7/03; H02K 33/16; H02K 1/2753; H02K 26/00; H02K 7/10
See application file for complete search history.

(56) References Cited

U.S. PATENT DOCUMENTS

| 4,287,457 | A | | 9/1981 | Takemura |
| 4,890,027 | A | * | 12/1989 | Bohner ................... F16D 63/00 310/328 |

(Continued)

FOREIGN PATENT DOCUMENTS

| JP | 54-034014 A | 3/1979 |
| JP | 7-213042 A  | 8/1995 |

(Continued)

OTHER PUBLICATIONS

International Search Report (PCT/ISA/210) issued in PCT/JP2016/064525, dated Aug. 2, 2016.

*Primary Examiner* — Thai T Dinh
(74) *Attorney, Agent, or Firm* — Birch, Stewart, Kolasch & Birch, LLP

(57) ABSTRACT

A movable body portion Sm is configured to reciprocate in a rotation angle range Zm between a first position Xa and a second position Xb according to energization control of a driving coil 6 and to be stopped at the first position Xa and the second position Xb by a pair of self-holding mechanisms 11a and 11b by restriction of a pair of restricting stopper mechanisms 10a and 10b and attraction of magnets 8a and 8b. when controlling switching from the second position Xb (or the first position Xa) to the first position Xa (or the second position Xb), after a driving voltage based on a driving pulse Ps is applied to the driving coil 6, if the movable body portion Sm has reached a predetermined intermediate position Xp in 10 to 50[%] of the rotation angle range Zm, control is performed so that application of the driving voltage is stopped.

10 Claims, 11 Drawing Sheets

(56) References Cited

U.S. PATENT DOCUMENTS

| | | | | |
|---|---|---|---|---|
| 4,947,069 A * | 8/1990 | Grant | ............... | H02K 7/125 |
| | | | | 188/166 |
| 5,684,350 A * | 11/1997 | Hara | ............... | H02K 5/225 |
| | | | | 310/89 |
| 9,350,285 B2 * | 5/2016 | Furuki | ............ | H02P 25/032 |
| 2016/0322889 A1 * | 11/2016 | Takahashi | ......... | H02K 33/16 |

FOREIGN PATENT DOCUMENTS

| | | |
|---|---|---|
| JP | 8-228467 A | 9/1996 |
| JP | 2009/038874 A | 2/2009 |
| JP | 2012-080705 A | 4/2012 |

\* cited by examiner

ROTARY SOLENOID DRIVE CONTROL METHOD

TECHNICAL FIELD

The present invention relates to a rotary solenoid drive control method suitable for use in controlling a rotary solenoid.

BACKGROUND ART

Generally, a rotary solenoid having a reciprocating property is used for various two-position switching purposes such as switching of a conveying path for sorting banknotes or switching of an optical path of an optical device. A rotary solenoid used for such a switching purpose often needs to provide fast operations (high-speed processing) and a reduction in size (thickness) as well as reliability in operation which are contradictory performances. Generally, a driving device is connected to the rotary solenoid of this type and a driving pulse to which a predetermined driving voltage is set is supplied to the rotary solenoid whereby drive control for two-position switching is performed.

Conventionally, a drive control method for use in a rotary solenoid disclosed in Patent Document 1 as proposed by the present applicant is known as a drive control method for controlling driving of such a rotary solenoid. This drive control method controls driving of a rotary solenoid including a magnet rotor portion in which a magnet portion having at least a pair of different poles is provided in a shaft, a stator portion having at least a pair of yokes disposed to be fixed to a position opposing an outer circumferential surface of the magnet portion, a coil unit portion that generates magnetic poles in the yoke with aid of a coil wound around a coil bobbin, an engagement portion formed such that a portion of the magnet portion protrudes in a radial direction so as to be positioned between the pair of yokes and be displaced between edges in a circumferential direction and that a width in the circumferential direction corresponds to a rotation range, and a pair of restricting portions that restricts the position of the engagement portion with the aid of the edges or by making contact with the engagement portion near the edges. In this drive control method, after a driving voltage is applied to the coil and the magnet rotor portion collides with the engagement portion formed to correspond to the rotation range, bouncing decays, and application of the driving voltage is canceled at a timing at which behavior is stabilized.

CITATION LIST

Patent Document

Patent Document 1: Japanese Patent Application Laid-Open No. 2012-80705

SUMMARY OF THE INVENTION

Problems to be Solved by the Invention

However, the conventional drive control method for controlling driving of a rotary solenoid as well as the drive control method of Patent Document 1 have the following problems to be solved.

A first problem is that, since control of supplying a current at least over an entire rotation range, and even after the magnet rotor portion reaches the engagement portion, the current supplying control is performed until the behavior is stabilized, the influence of a temperature rise of the coil is not negligible. That is, when the rotary solenoid is continuously used for a long period, the resistance of the coil increases with increase in the temperature of the coil, and as a result, the output torque decreases and the stability decreases. Particularly, the decrease in the output torque has a direct influence on decrease in response speed and the switching speed and becomes a factor that inhibits a fast switching operation (high-speed processing). Moreover, the decrease in the stability is a negative factor from the viewpoint of performing a stable switching operation according to a constant output torque.

A second problem is that, since electric power is used, it is requested to reduce power consumption and enhance energy saving properties and cost effectiveness from the viewpoint of saving resources and protecting global environment. However, since basic driving control is performed by simple control of supplying driving pulses, in order to reduce the power consumption, it is necessary to decrease an application voltage which is an essential element in realizing an intended operation and to shorten an energization period. As a result, elements to be improved are limited. Therefore, it cannot be said that sufficient considerations are taken from the viewpoint of reducing power consumption, and from this viewpoint, there is a room for further improvements.

An object of the present invention is to provide a rotary solenoid drive control method that solves the problems of such a background art.

Solutions to Problems

In order to solve the above-described problems, a rotary solenoid drive control method according to the present invention is a rotary solenoid drive control method for controlling driving of a rotary solenoid including: a fixed body portion Sc having a casing 2 in which a pair of bearing portions $3f$ and $3r$ positioned on front and rear sides are provided; and a movable body portion Sm having a rotation shaft 4 rotatably supported by the pair of bearing portions $3f$ and $3r$, wherein the movable body portion Sm is configured to reciprocate in a rotation angle range Zm between a first position Xa and a second position Xb according to energization control of a driving coil 6 and to be stopped at the first position Xa and the second position Xb by a pair of self-holding mechanisms 11a and 11b by restriction of a pair of restricting stopper mechanisms 10a and 10b and attraction of magnets 8a, 8af, ..., 8b, 8bf, and so on, and when controlling switching from the second position Xb (or the first position Xa) to the first position Xa (or the second position Xb), after a driving voltage based on a driving pulse Ps is applied to the driving coil 6, if the movable body portion Sm has reached a predetermined intermediate position Xp in 10 to 50[%] of the rotation angle range Zm, control is performed so that application of the driving voltage is stopped.

In this case, according to a preferred embodiment of the present invention, the fixed body portion Sc may include a casing 2 formed of a magnetic material and a driving coil 6 which uses an air-cored coil fixed to an inner surface $2f$ (or $2r$) of the casing 2, which is a surface orthogonal to an axial direction Fs of the rotation shaft 4, and the movable body portion Sm may include a rotor yoke 7 having one end $7s$ fixed to the rotation shaft 4 and a magnet mechanism portion 8 having a pair of magnets $8af$ and $8bf$ fixed to an opposing surface $7p$ positioned on the other end $7t$ of the rotor yoke 7, which is a surface opposing the driving coil 6, and disposed along a rotation direction Fr of the opposing surface 7p. Moreover, the fixed body portion Sc and the movable body portion Sm may share the restricting stopper mechanisms 10a and 10b that make contact with each other to restrict the movable body portion Sm, and the casing 2 may share the self-holding mechanisms 11a and 11b that attract the movable body portion Sm at the first position Xa and the second position Xb. The self-holding mechanisms 11a and 11b may preferably use attracting piece portions 11as and 11bs that protrude from a portion of the casing 2.

On the other hand, the movable body portion Sm may include a driving coil 6 held by a movable block portion 13e, the rotation shaft 4 fixed to the movable block portion 13e and disposed to be arranged in parallel to a center of the driving coil 6, and an attracting piece 16 formed of a magnetic material and fixed to a predetermined position of the movable block portion 13e, and the fixed body portion Sc may include a casing 2 formed of a magnetic material, and a magnet mechanism portion 8 having two sets of magnet portions 8a and 8b fixed to inner surfaces 2f and 2r of the casing 2, disposed to oppose an end in an axial direction Fs of the driving coil 6, and disposed to correspond to the first position Xa and the second position Xb of the movable body portion Sm. In this case, the magnet portion 8a or 8b may be formed of a single magnet 8af or 8bf disposed on one inner surface 2f of the casing 2, opposing one end in the axial direction Fs of the driving coil 6, and the magnet portion 8a or 8b may be formed of a pair of magnets 8af, Bar, 8bf, and so on disposed on both opposing inner surfaces 2f and 2r of the casing 2, opposing both ends in the axial direction Fs of the driving coil 6. A cross-sectional area vertical to an axial direction of the attracting piece 16 may preferably be set to a range of 0.1 to 10[%] of a cross-sectional area vertical to an axial direction of an inner space of the driving coil 6.

Effects of the Invention

According to the rotary solenoid drive control method according to the present invention based on such a method provides the following remarkable effects.

(1) When controlling switching from the second position Xb (or the first position Xa) to the first position Xa (or the second position Xb), after a driving voltage based on a driving pulse Ps is applied to the driving coil 6, if the movable body portion Sm has reached a predetermined intermediate position Xp in 10 to 50[%] of the rotation angle range Zm, control is performed so that application of the driving voltage is stopped. Therefore, it is possible to shorten the energization period Tp remarkably and to extend a non-energization period. As a result, it is possible to suppress a temperature rise (resistance rise) of the driving coil 6 and to avoid decrease in output torque and stability. In this way, it is possible to secure fast switching operations (high-speed processing) which is always necessary while maintaining a high response speed and to achieve a stable switching operation. Furthermore, it is possible to contribute to remarkable reduction in power consumption.

(2) Since the displacement of the movable body portion Sm is based on constant-speed movement after application of the driving voltage based on the driving pulse Ps is stopped, it is possible to decrease the number and the magnitude of bounces of the movable body portion Sm upon collision at the first position Xa (or the second position Xb) remarkably. As a result, it is possible to contribute to realizing small impact (small vibration) and low noise of the rotary solenoid 1 itself.

(3) According to the preferred embodiment, the fixed body portion Se includes a casing 2 formed of a magnetic material and a driving coil 6 which uses an air-cored coil fixed to an inner surface 2f (or 2r) of the casing 2, which is a surface orthogonal to an axial direction Fs of the rotation shaft 4, and the movable body portion Sm includes a rotor yoke 7 having one end 7s fixed to the rotation shaft 4 and a magnet mechanism portion 8 having a pair of magnets 8af and 8bf fixed to an opposing surface 7p positioned on the other end 7t of the rotor yoke 7, which is a surface opposing the driving coil 6, and disposed along a rotation direction Fr of the opposing surface 7p. Therefore, it is possible to eliminate an iron core which is a large component and to reduce the number of components. Moreover, by arranging the center of the driving coil 6 to be parallel to the center of the rotation shaft 4, a layout structure which can easily achieve a small size (a small thickness) can be obtained. Therefore, it is possible to easily realize reduction in the size (particularly, the thickness) of the entire rotary solenoid 1 and to contribute to reduction in the weight and the cost of the entire rotary solenoid 1. Moreover, since the air-cored coil is used, the inductance that is proportional to the permeability in the inner space of the air-cored coil can be decreased to a very small value of several mH. As a result, since a very fast response speed can be realized in such a way that the current can be raised up to a saturation current substantially instantaneously when a driving voltage is applied, it is possible to realize fast operations and to contribute to improvement in productivity and processing speed of a target device in which the rotary solenoid 1 is used.

(4) According to the preferred embodiment, when the fixed body portion Sc and the movable body portion Sm share the restricting stopper mechanisms 10a and 10b that make contact with each other to restrict the movable body portion Sm, since an additional component for forming the restricting stopper mechanisms 10a and 10b is not necessary, it is possible to reduce the number of components and the number of assembling steps and to decrease the size and the cost.

(5) According to the preferred embodiment, when the casing 2 shares the self-holding mechanisms 11a and 11b that attract the movable body portion Sm at the first position Xa and the second position Xb, since an additional component that forms the self-holding mechanisms 11a and 11b is not necessary, it is possible to reduce the number of components and the number of assembling steps and to decrease the size and the cost.

(6) According to the preferred embodiment, when the self-holding mechanisms 11a and 11b uses the attracting piece portions 11as and 11bs that protrude from a portion of the casing 2, since the self-holding mechanisms 11a and 11b can be formed by pressing during fabrication of the casing 2, for example, it is possible to fabricate the self-holding mechanisms 11a and 11b easily and to optimize the holding performance of the self-holding mechanisms 11a and 11b easily and flexibly.

(7) According to the preferred embodiment, the movable body portion Sm includes a driving coil 6 held by a movable block portion 13e, the rotation shaft 4 fixed to the movable block portion 13e and disposed to be arranged in parallel to a center of the driving coil 6, and an attracting piece 16 formed of a magnetic material and fixed to a predetermined position of the movable block portion 13e, and the fixed body portion Sc includes a casing 2 formed of a magnetic material, and a magnet mechanism portion 8 having two sets of magnet portions 8a and 8b fixed to inner surfaces 2f and 2r of the casing 2, disposed to oppose an end in an axial direction Fs of the driving coil 6, and disposed to correspond to the first position Xa and the second position Xb of the movable body portion Sm. With this configuration, the heavy magnet portions 8a and 8b are fixed to the inner surfaces 2f and 2r of the casing 2 serving as a fixed side and the relatively light driving coil 6 is supported by the rotation shaft 4 serving as a movable side. Therefore, it is possible to decrease an overall weight of the movable body portion Sm remarkably and to secure a fast response speed and a high output torque. Furthermore, since the magnets that form the magnet portions 8a and 8b are disposed on the inner surface of the casing 2 opposing the end in the axial direction Fs of the driving coil 6 supported by the rotation shaft 4, it is possible to increase the size of the magnet as long as the arrangement space of the inner surfaces 2f and 2r of the casing 2 is allowed. As a result, it is possible to realize overall downsizing of the rotary solenoid 1 while securing necessary performance.

(8) According to the preferred embodiment, when the magnet portion 8a and 8b is formed of a single magnet 8af and 8bf disposed on one inner surface 2f of the casing 2, opposing one end in the axial direction Fs of the driving coil 6, since a minimum necessary number of components are used, the rotary solenoid can be implemented as the best advantageous form from the viewpoint of reducing the size and the cost of the rotary solenoid 1.

(9) According to the preferred embodiment, the magnet portion 8a and 8b is formed of a pair of magnets 8af, 8ar, 8bf, and so on disposed on both opposing inner surfaces 2f and 2r of the casing 2, opposing both ends in the axial direction Fs of the driving coil 6. With this configuration, since the number of magnets is doubled as compared to a case in which the magnets 8af and 8bf are disposed on one inner surface 2f of the casing 2, the rotary solenoid can be implemented as the best advantageous form from the viewpoint of securing the response speed, the output torque, the magnetic balance, and the stability of the rotary solenoid 1.

(10) According to the preferred embodiment, the cross-sectional area vertical to an axial direction of the attracting piece 16 is set to a range of 0.1 to 10[%] of a cross-sectional area vertical to an axial direction of an inner space of the driving coil 6. When the cross-sectional area is set in this manner, it is possible to realize a stable self-holding action reliably from the viewpoint of securing an attraction force (holding torque) necessary for obtaining a self-holding force during stopping and eliminating an unnecessary attraction force and to optimize the self-holding action easily.

REFERENCE SIGNS LIST

1: Rotary solenoid, 2: Casing, 2f: Inner surface of casing, 2r: Inner surface of casing, 3f: Bearing portion, 3r: Bearing portion, 4: Rotation shaft, 6: Driving coil, 7: Rotor yoke, 7s: One end of rotor yoke, 7t: Other end of rotor yoke, 7f: Opposing surface, 8: Magnet mechanism portion, 8a: Magnet portion, 8b: Magnet portion, 8af: Magnet, 8bf: Magnet, 8ar: Magnet, 10a: Restricting stopper mechanism, 10b: Restricting stopper mechanism, 11a: Self-holding mechanism, 11b: Self-holding mechanism, 11as: Attracting piece portion, 11bs: Attracting piece portion, 13e: Movable block portion, 16: Attracting piece, Sc: Fixed body portion, Sm: Movable body portion, Xa: First position, Xb: Second position, Xp: Intermediate position, Zm: Rotation angle range, Ps: Driving pulse, Fs: Axial direction, Fr: Rotation direction

BEST MODE FOR CARRYING OUT THE INVENTION

Next, a preferred embodiment according to the present invention will be described in detail based on the drawings.

First, a rotary solenoid 1 according to preferred first and second embodiments will be described with reference to FIGS. 8 to 19 using a drive control method according to the present invention.

First Embodiment

First, the rotary solenoid 1 according to the first embodiment will be described with reference to FIGS. 8 to 15. The rotary solenoid 1 roughly includes a fixed body portion Sc having a casing 2 in which a pair of bearing portions 3*f* and 3*r* positioned on front and rear sides are provided and a movable body portion Sm having a rotation shaft 4 rotatably supported by the pair of bearing portions 3*f* and 3*r*.

Figure 8:
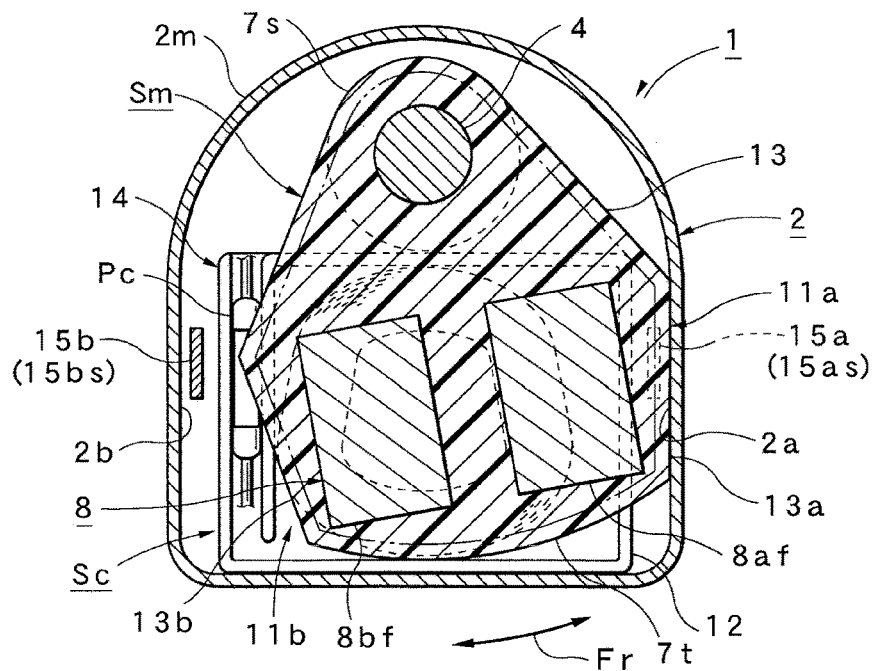
FIG. 8 is a cross-sectional rear view at the position of line C-C in FIG. 2, of the rotary solenoid.
Figure 9:
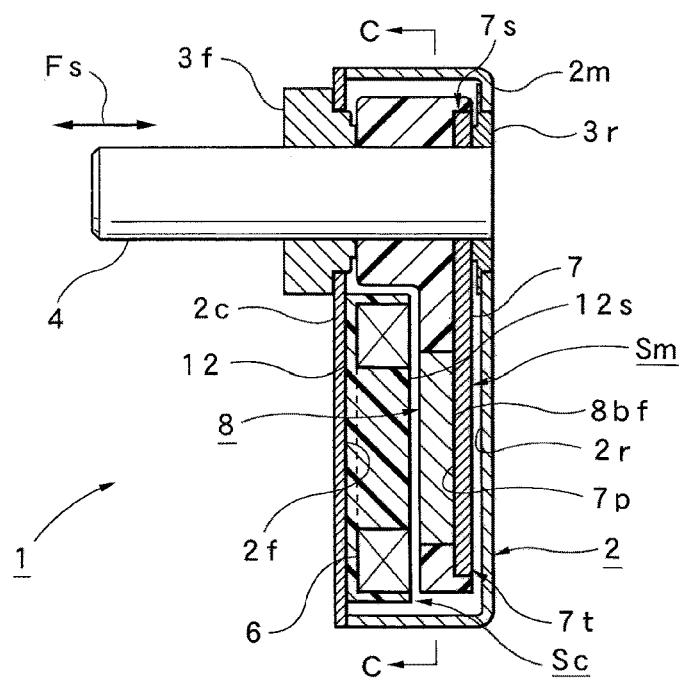
FIG. 9 is a cross-sectional side view of the rotary solenoid.

The fixed body portion Sc includes the casing 2 illustrated in FIGS. 8 and 9, and the casing 2 includes a frame portion 2*m* having an open front surface and a lid portion 2*c* that covers the open surface of the frame portion 2*m*. In this case, an inner surface of the lid portion 2*c* serves as a front-side inner surface 2*f* of the casing 2, and an inner surface of the frame portion 2*m* opposing (facing) the inner surface 2*f* serves as a rear-side inner surface 2*r* of the casing 2. A height dimension of the casing 2 illustrated in FIG. 8 is 16 [mm].

The frame portion 2*m* is formed in a box form having an open front surface using a soft magnetic steel plate (a magnetic material) such as a cold rolled steel plate. In this case, the plate thickness can be reduced further when pure iron or a silicon steel plate having a high saturation magnetic flux density is used. On the other hand, when the thickness of the steel plate is set to approximately half (0.5 to 2.0 [mm]) (that is, a relatively large thickness) of the thickness of the magnet 8*af* (8*bf*), it is possible to prevent saturation of a magnetic circuit of the yoke and to suppress leakage of magnetic fluxes due to saturation. In addition, since a vibration (amplitude) when the movable body portion Sm collides with a certain component can be suppressed, it is also possible to contribute to reduction in collision sound.

A bearing attachment hole is formed at an upper position of the inner surface 2*r* of the frame portion 2*m* and the rear-side bearing portion 3*r* formed in a ring form is attached to the bearing attachment hole. In this case, since the movable body portion Sm is attracted toward the front side (toward the lid portion 2*c*), relatively large stress is not applied to the rear-side bearing portion 3*r*, and large mechanical strength is not required for the bearing portion 3*r*. Therefore, a synthetic resin material can be used as a material for forming the bearing portion 3*r*, and the thickness in the axial direction Fs can be reduced.

On the other hand, the lid portion 2*c* can be formed using a material similar to that of the frame portion 2*m*, except that the lid portion 2*c* is formed in a form of one piece of plate. Moreover, a circular attachment hole is formed at an upper position of the inner surface 2*f* of the lid portion 2*c* and the front-side bearing portion 3*f* formed in a ring form is attached to the circular attachment hole. As described above, since the movable body portion Sm is attracted toward the front side (toward the lid portion 2*c*) by a magnetic circuit, the bearing portion 3*f* needs to secure mechanical strength sufficient for resisting against this stress. Therefore, the bearing portion 3*f* is formed integrally using a metallic material and has a large thickness in the axial direction Fs. The lid portion 2*c* is firmly fixed by welding, caulking, or the like.

In this way, when the frame portion 2*m* is assembled with the lid portion 2*c*, a plurality of (in this example, four) caulking piece portions 2*mp* formed to protrude from an opening edge of the frame portion 2*m* may be bent (see FIG. 11) to press concave portions 2*cp* formed in the lid portion 2*c*. In this manner, the casing 2 can be easily assembled by the frame portion 2*m* and the lid portion 2*c*, and the casing 2 forms a portion of a magnetic circuit (a magnetic path) that magnetic lines of force from magnets 8*af* and 8*bf* to be described later pass through.

Figure 5:
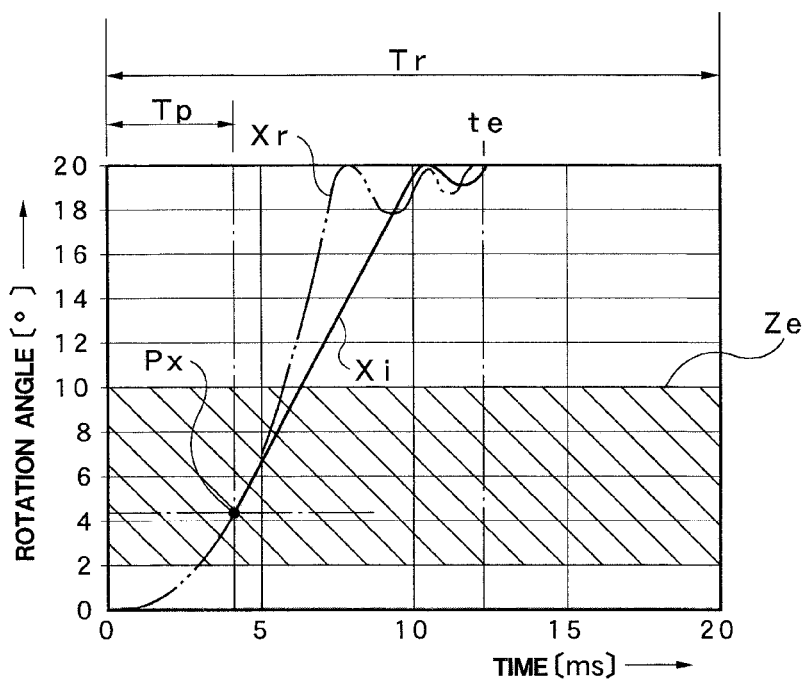
FIG. 5 is a diagram illustrating time-rotation angle characteristics of a movable body portion including a comparative example when the rotary solenoid is driven by the driving device.

On the other hand, since the lid portion 2*c* functions substantially as the fixed body portion Sc, a rectangular fixed block portion 12 integrally molded using a synthetic resin material which is an insulating material (a non-magnetic material) is fixed to a lower position of the inner surface 2*f* of the lid portion 2*c*. In this case, as illustrated in FIG. 5, a plurality of pin-shaped convex portions 12*p* are formed on an attachment surface of the fixed block portion 12 and the convex portions 12*p* are inserted to the concave portions 2*fc* formed in the lid portion 2*c*. In this way, positioning of the fixed block portion 12 with respect to the lid portion 2*c* is realized, and the distal ends of the inserted convex portions 12*p* are fixed by thermal deformation or the like. The use of the fixed block portion 12 is not essential. For example, a steel substrate which is formed of a steel plate such as an electro-galvanized zinc plated steel plate and in which an insulating layer such as a polyimide layer is formed on a surface of the steel plate and a copper pattern is formed on the insulating layer may be used as the lid portion 2*c*. By doing so, electrical connection with lead wires or an driving coil 6 to be described later or mounting of a circuit component Pc such as a thermal fuse can be realized on the inner surface 2*f* of the lid portion 2*c*, which contributes to reduction in the number of assembling steps.

Figure 10:
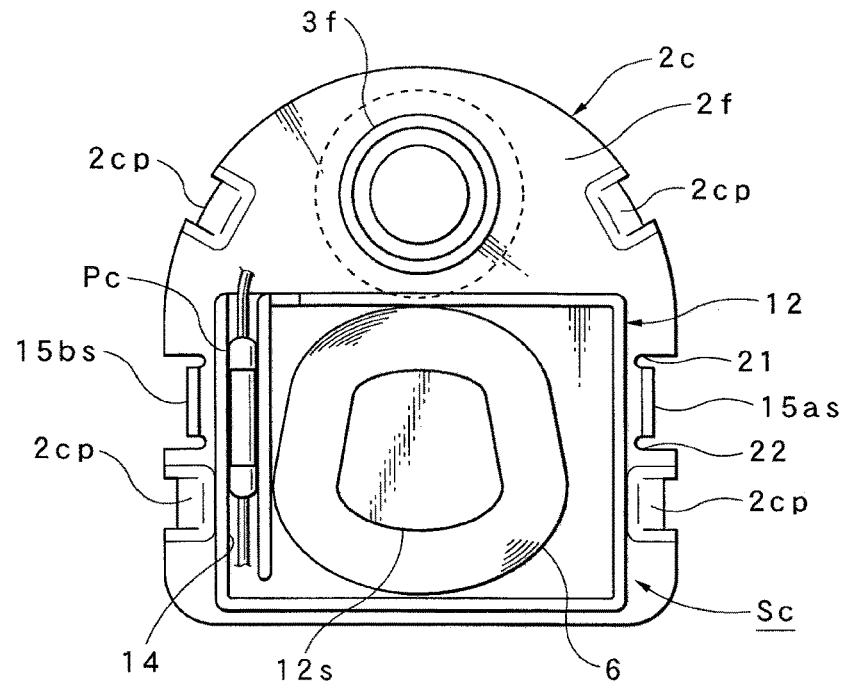
FIG. 10 is a diagram illustrating an inner structure of a fixed body portion, illustrating a cover-side inner surface that forms a casing of the rotary solenoid.

A coil supporting convex portion 12-1 and 12-2 inserted to an inner space of the driving coil 6 which uses an air-cored coil to position and fix the driving coil 6 is integrally formed to protrude from a central position of the fixed block portion 12, and a component holding portion 14 for holding one or two or more circuit components Pc connected to the driving coil 6 is integrally formed in a portion of the fixed block portion 12 where the driving coil 6 is not positioned as illustrated in FIG. 10. The component holding portion 14 can be formed in a channel form.

In this manner, when the fixed block portion 12 formed of a non-magnetic material, holding the driving coil 6 is provided in the fixed body portion Sc, the driving coil 6 can be positioned at an accurate position by the fixed block portion 12 and can be easily assembled with respect to the casing 2. Furthermore, when the component holding portion 14 is formed integrally with the fixed block portion 12, since the circuit component Pc can be held (fixed) at a predetermined position of the fixed block portion 12 adjacent to the driving coil 6, it is possible to avoid troubles such as open-circuit on an energization circuit including lead wires drawn from the driving coil 6 and to contribute to improvement in reliability.

The driving coil 6 is prepared as follows. The driving coil 6 is a single air-cored coil around which a magnet wire (an annealed copper wire) is wound. In the first embodiment, as illustrated in FIG. 10, the driving coil 6 is formed in such a shape that a circular coil is deformed in an approximately rectangular form (a trapezoidal form). In this case, the driving coil 6 is preferably exposed to hot air of several hundreds of temperature [° C.] to achieve thermal welding so that adhesion strength between magnet wires is secured. When the thermally welded driving coil 6 is pressed in a thickness direction, a space factor of a conductor (that is, an ampere turn) can be increased. Therefore, it is possible to contribute to reduction in thickness of the entire rotary solenoid 1, and to further increase the ampere turn when a flat wire is used as the magnet wire.

The driving coil 6 is attached to the fixed block portion 12 and is fixed by an adhesive or the like, and the circuit component Pc is accommodated in the component holding portion 14 and is fixed by an adhesive or the like. The driving coil 6 and the circuit component Pc are connected and are connected to lead wires whereby a lid portion 2*c* side assembly is obtained. The illustrated circuit component Pc is a thermal fuse connected in series to the driving coil 6.

Moreover, the circuit component Pc also includes lead wires (lead-out wires of the driving coil 6).

On the other hand, the movable body portion Sm includes the rotation shaft 4 rotatably supported by the pair of bearing portions 3*f* and 3*r* provided in the casing 2. The rotation shaft 4 is formed of a metallic material having high rigidity such as a stainless material. The material may be a magnetic material or a non-magnetic material. When a magnetic material is used, the rotation shaft 4 can be used as a part of a magnetic circuit of the rotary solenoid 1.

One end of the movable block portion 13 integrally molded using a synthetic resin material which is an insulating material (a non-magnetic material) is fixed onto the rotation shaft 4. Although it is preferable to form the movable block portion 13 using a synthetic resin material from the viewpoint of decreasing the moment of inertia as much as possible, a metallic material having a small specific gravity such as aluminum or magnesium may be used. Particularly, when a PA resin material such as a nylon material is used as the synthetic resin material, a vibration absorbing effect is obtained. When magnesium having a weight equivalent to the synthetic resin material is used as the metallic material, it is possible to obtain a vibration absorbing effect while securing high strength.

The movable block portion 13 includes a cylindrical upper block part 13*u* positioned in an upper part and a flat plate-shaped lower block part 13*d* extended downward from a central position in the axial direction Fs of the upper block part 13*u*. The movable block portion 13 is fixed in a state in which an intermediate portion of the rotation shaft 4 passes through the upper block part 13*u*. In this case, the movable block portion 13 can be fixed by press-fitting, welding, or the like. A ridged pattern or the like is preferably formed on a circumferential surface of the rotation shaft 4 that fixes the upper block part 13*u* to thereby increase the fixing strength further.

A rotor yoke 7 having a shape smaller than but similar to the movable block portion 13 is arranged on a rear surface of the movable block portion 13. In this way, one end (an upper end) 7*s* of the rotor yoke 7 is fixed to the rotation shaft 4. The rotor yoke 7 can be formed of one piece of plate which is funned of a soft magnetic steel plate (a magnetic material) such as a cold rolled steel plate and of which the thickness Lp is set to approximately half the thickness Lm in the axial direction Fs of the magnets 8*af* and 8*bf*. In this case, the thickness Lp of the rotor yoke 7 in a portion where the magnetic fluxes between the magnets 8*af* and 8*bf* concentrate the most is preferably set to be small such that the rotor yoke 7 can be used even if magnetic fluxes saturate by taking a magnetic circuit associated with the adjacent casing 2 to consideration. In this way, it is possible to improve the efficiency of a magnetic circuit and to contribute to reducing the size and the thickness.

A magnet mechanism portion 8 made up of the pair of magnets 8*af* and 8*bf* is fixed to an opposing surface 7*p* opposing the driving coil 6 as illustrated in FIG. 9, on the side of the other end 7*t* of the rotor yoke 7 positioned in the lower block part 13*d*. In this case, the magnets 8*af* and 8*bf* are formed in a flat rectangular solid form of which the thickness is set to Lm and are arranged at a predetermined interval along a rotation direction Fr (that is, a turning direction) of the opposing surface 7*p*. As illustrated in FIG. 9, the magnets 8*af* and 8*bf* pass through the movable block portion 13 and are exposed to the front surface of the movable block portion 13. One of the magnet surfaces of each of the exposed magnets 8*af* and 8*bf* serves as the N pole and the other magnet surface serves as the S pole.

A ferrite magnet, a rare-earth magnet, and the like can be used for the magnets 8*af* and 8*bf* but there is no particular limitation thereto. As an example, when a [Nd—Fe—B] magnet is used, since a high air-gap magnetic flux density is obtained, it is possible to increase the output torque and to further increase the magnetic flux density at the air gap by making the most of magnetic characteristics when the magnet is oriented (magnetized) in a thickness direction. When the thickness Lm of the magnets 8*af* and 8*bf* is set to approximately 2 to 4 [mm] and the air gap is set to approximately 4 to 8 [mm] that is twice the thickness, it is possible to obtain a permeance coefficient of 0.5 or larger and to obtain an air-gap magnetic flux density of 0.5 [T] or larger. A single magnet can be used as the pair of magnets 8*af* and 8*bf*, and particularly, a single magnet in which two poles are magnetized in a divided manner in a planar direction can also be used as the pair of magnets 8*af* and 8*bf*.

As described above, since the movable body portion Sm includes the rotation shaft 4, the movable block portion 13, the rotor yoke 7, and the magnets 8*af* and 8*bf*, these components may be assembled to obtain the movable body portion Sm. The rotation shaft 4, the rotor yoke 7, and the magnets 8*af* and 8*bf* may be insert-molded when the movable block portion 13 is molded. When such a movable block portion 13 is provided, the rotation shaft 4, the rotor yoke 7, and the magnet mechanism portion 8 can be integrated using the movable block portion 13 which can be formed of a synthetic resin material or the like as a base. Therefore, it is possible to fabricate the movable body portion Sm easily by insert-molding and to improve the fixing strength (rigidity) between the rotation shaft 4, the rotor yoke 7, and the magnet mechanism portion 8 and to improve the positioning accuracy.

On the other hand, a pair of restricting stopper mechanisms 10*a* and 10*b* for restricting a rotation angle range Zm of the movable body portion Sm is provided inside the casing 2. In this case, the pair of restricting stopper mechanism 10*a* and 10*b* are shared for the fixed body portion Sc and the movable body portion Sm. Specifically, as illustrated in FIG. 8, one side surface in the rotation direction Fr of the movable block portion 13 that forms the movable body portion Sm is formed as a restricting surface portion 13*a* and the other side surface is formed as a restricting surface portion 13*b*. Due to this, when the movable body portion Sm is rotated toward one side (toward a first position Xa), the restricting surface portion 13*a* makes contact with one inner surface 2*a* of the casing to restrict the rotation. When the movable body portion Sm is rotated toward the other side (toward a second position Xb), the restricting surface portion 13*b* makes contact with the other inner surface 2*b* of the casing 2 to restrict the rotation. Therefore, one restricting surface portion 13*a* of the movable body portion Sm and one inner surface 2*a* of the fixed body portion Sc form one restricting stopper mechanism 10*a*, and the other restricting surface portion 13*b* of the movable body portion Sm and the other inner surface 2*b* of the fixed body portion Sc form the other restricting stopper mechanism 10*b*.

Figure 11:
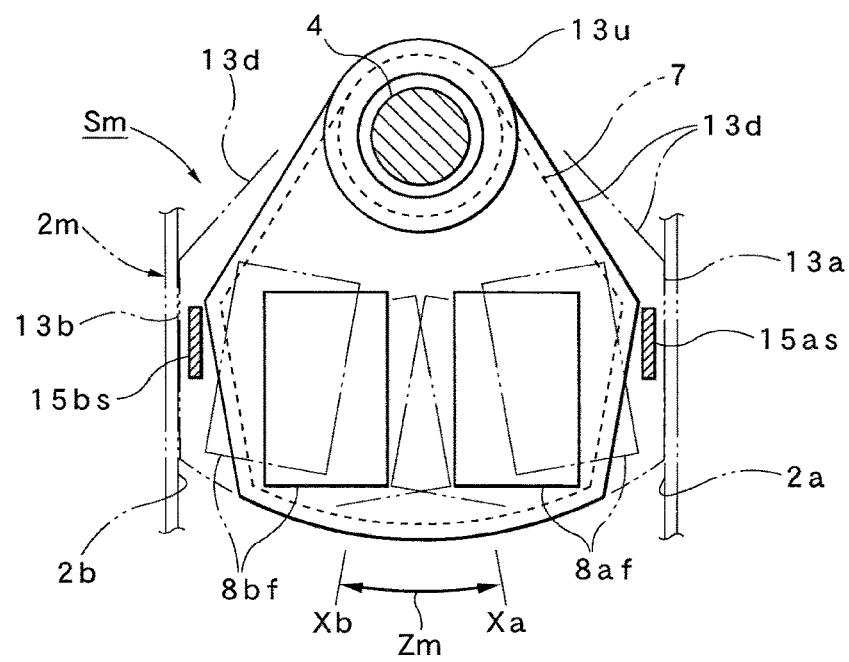
FIG. 11 is a partially cross-sectional front view illustrating a movable body portion of the rotary solenoid.

In this way, when the pair of restricting stopper mechanisms 10*a* and 10*b* that make contact with each other to restrict the rotation angle range Zm of the movable body portion Sm are shared for the fixed body portion Sc and the movable body portion Sm, since an additional component for forming the restricting stopper mechanisms 10*a* and 10*b* is not necessary, it is possible to reduce the number of components and the number of assembling steps and to decrease the size and the cost. Particularly, when the pair of restricting surface portions 13*a* and 13*b* that make contact with the inner surfaces 2a and 2b of the casing 2 to form the restricting stopper mechanisms 10a and 10b are provided in the movable block portion 13, since a portion of the movable block portion 13 which can be formed of a synthetic resin material or the like can be used as the restricting surface portions 13a and 13b, it is possible to form the restricting stopper mechanisms 10a and 10b easily and to set the rotation angle range Zm of the movable block portion 13 easily. In FIG. 11, the movable body portion Sm at the position where the movable body portion Sm is restricted by the restricting stopper mechanisms 10a and 10b is indicated by an imaginary line. Therefore, the rotation angle range Zm of the movable body portion Sm is a range in which the movable body portion Sm is restricted by the pair of restricting stopper mechanisms 10a and 10b, and the positions at which the movable body portion Sm is restricted by the pair of restricting stopper mechanisms 10a and 10b are the first position Xa and the second position Xb at both ends of the rotation angle range Zm.

Figure 13:
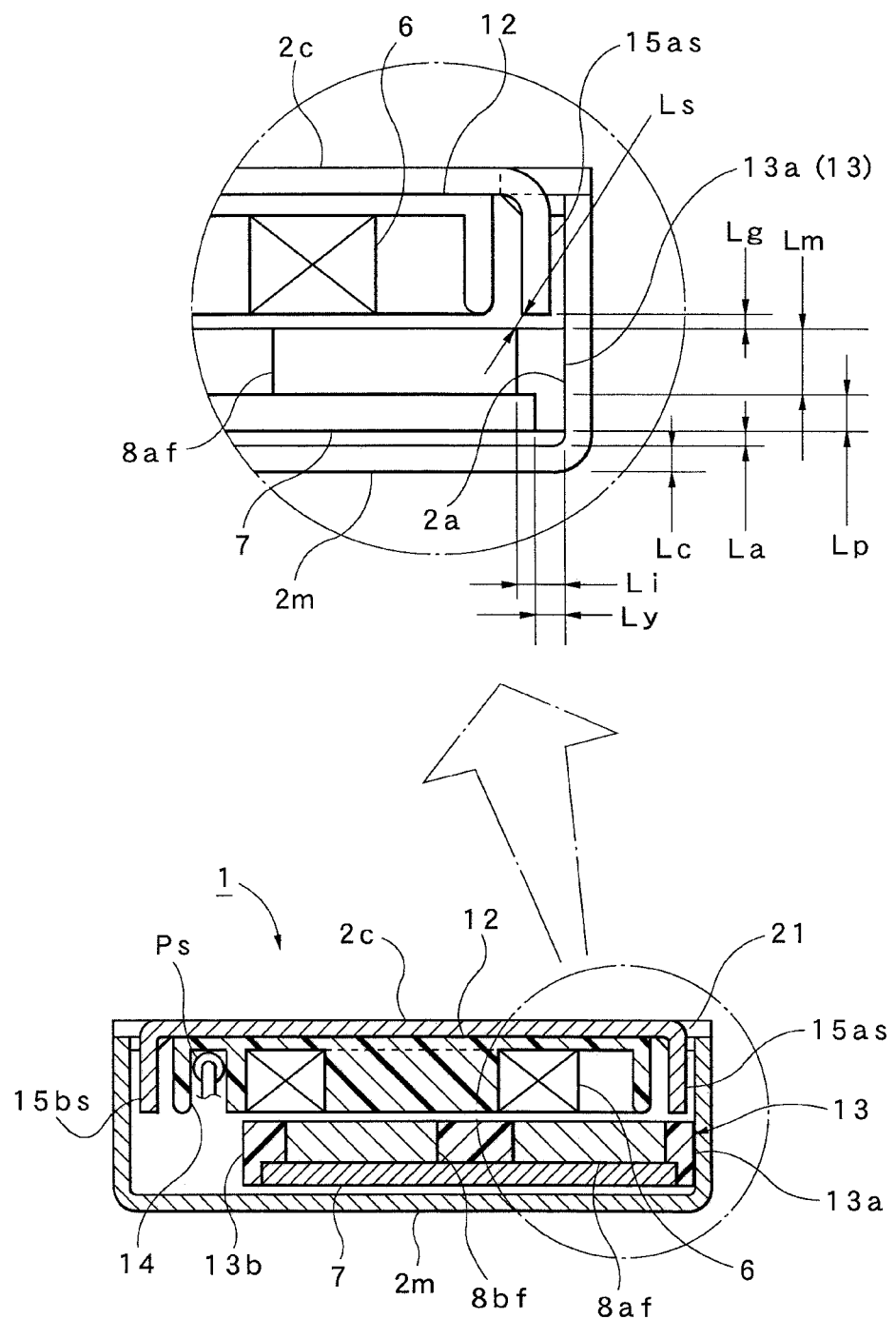
FIG. 13 is a cross-sectional plan view including an enlarged view of a portion of the rotary solenoid.

Self-holding mechanisms 11a and 11b that attract the movable body portion Sm at the first and second positions Xa and Xb to hold the position of the movable body portion Sm are provided inside the casing 2. In the illustrated example, the self-holding mechanisms 11a and 11b are shared by the casing 2. Specifically, as illustrated in FIGS. 10 and 13, a pair of cut-in portions 21 and 22 are formed in an edge of the lid portion 2c that forms the casing 2, and a strip-shaped piece formed between the cut-in portions 21 and 22 is bent toward the inner side at 90 [°] to form one attracting piece portion 15as. In this way, one self-holding mechanism 11a is formed such that, when the movable body portion Sm is rotated toward the first position Xa, one magnet 8af approaches the attracting piece portion 11as, and the movable body portion Sm is held at the first position Xa by the attraction of the magnet 8af and the attracting piece portion 11as. The other self-holding mechanism 11b is formed similarly to one self-holding mechanism 11a except that the self-holding mechanism 11b is bilaterally symmetrical to the self-holding mechanism 11a. Reference numeral 11bs indicates an attracting piece portion of the other self-holding mechanism 11b.

Therefore, since the movable body portion Sm includes the magnets 8af and 8bf, the attracting piece portions 11as and 11bs formed in the casing 2 form the pair of self-holding mechanisms 11a and 11b and the casing 2 shares the pair of self-holding mechanisms 11a and 11b. In this manner, when the pair of self-holding mechanisms 11a and 11b are shared by the casing 2, since an additional component that forms the self-holding mechanisms 11a and 11b is not necessary, it is possible to reduce the number of components and the number of assembling steps and to decrease the size and the cost. Particularly, when the self-holding mechanisms 11a and 11b are formed using the attracting piece portions 11as and 11bs that protrude a portion of the casing 2, the self-holding mechanisms 11a and 11b can be formed by pressing during fabrication of the casing 2, for example. Therefore, it is possible to fabricate the self-holding mechanisms 11a and 11b easily and to optimize the holding performance of the self-holding mechanisms 11a and 11b easily and flexibly.

Since the rotary solenoid 1 according to the first embodiment has a relatively simple structure (for example, the use of the air-cored coil (the driving coil 6), detailed dimensions are important factors. Hereinafter, particularly important factors associated with the dimensions of respective portions will be described with reference to FIG. 13.

First, a shortest distance Ls in the axial direction Fs between the magnet 8af and the attracting piece portion 11as (specifically, the shortest distance Ls between the attracting piece portion 11as and the magnet 8af of the movable body portion Sm at the first position Xa) is set to be smaller than the thickness Lm of the magnet 8af in the axial direction Fs. Moreover, the shortest distance Ls in the axial direction Fs between the magnet 8bf and the attracting piece portion 11bs (specifically, the shortest distance Ls between the attracting piece portion 11bs and the magnet 8bf of the movable body portion Sm at the second position Xb) is set to be smaller than the thickness Lm of the magnet 8bf in the axial direction Fs. When such conditions are selected, it is possible to secure a sufficient self-holding function when configuring the self-holding mechanisms 11a and 11b under the conditions and to easily optimize the self-holding function.

The magnet 8af and the attracting piece portion 11as are disposed in such a positional relation that these components do not overlap each other in the axial direction Fs, and the magnet 8bf and the attracting piece portion 11bs are disposed in such a positional relation that these components do not overlap each other in the axial direction Fs. Specifically, a gap Lg (Lg>0) is formed between the magnet 8af and the attracting piece portion 11as in the axial direction Fs, and the gap Lg is formed between the magnet 8bf and the attracting piece portion 11bs. When such positional conditions are selected, since a vector balance of the attracting force of the magnets 8af and 8bf and the attracting piece portions 11as and 11bs can be optimized under this positional relation, it is possible to secure a satisfactory self-holding function of the self-holding mechanisms 11a and 11b.

A shortest distance Ly between an end in the rotation direction Fr of the rotor yoke 7 and the inner surface 2a of the casing 2 at the first position Xa and a shortest distance Li between an end in the rotation direction Fr of the magnet 8af and the inner surface 2a of the casing 2 at the first position Xa are set to be smaller than the thickness Lm of the magnet 8af in the axial direction Fs. Moreover, the shortest distance Ly between an end in the rotation direction Fr of the rotor yoke 7 and the inner surface 2b of the casing 2 at the second position Xb and the shortest distance Li between an end in the rotation direction Fr of the magnet 8bf and the inner surface 2b of the casing 2 at the second position Xb are set to be smaller than the thickness Lm of the magnet 8bf in the axial direction Fs. When such conditions are selected, since the magnetic circuit of the rotary solenoid 1 according to the present invention can be constructed in an optimal form, it is possible to secure satisfactory magnetic properties due to the selected dimensions.

A distance La between the rotor yoke 7 and the inner surface 2r of the casing 2 facing the rotor yoke 7 is set to be smaller than a thickness Lc of the casing 2 in the inner surface 2r. When the distance is set in this manner, since the rotor yoke 7 and the casing 2 can function as an integrated complementary magnetic path, it is possible to construct a satisfactory magnetic circuit capable of suppressing magnetic leakage as much as possible.

Next, a method of manufacturing the rotary solenoid 1 according to the first embodiment will be described with reference to FIG. 12.

Figure 12:
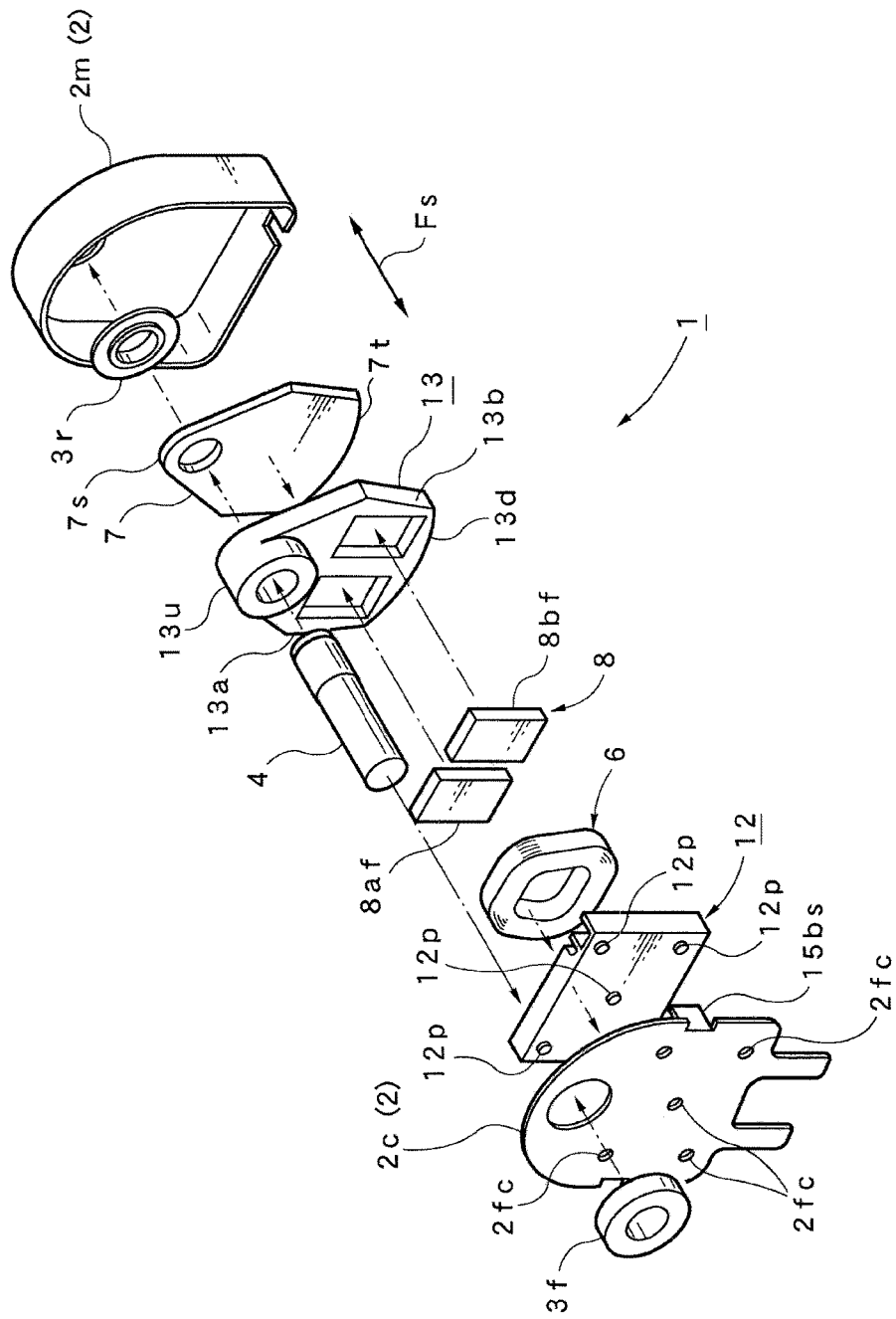
FIG. 12 is an exploded perspective view of the rotary solenoid.

FIG. 12 illustrates an exploded perspective view of the rotary solenoid 1 according to the first embodiment. As understood from FIG. 12, respective components can be assembled along the axial direction Fs.

First, the assembly of the lid portion 2c is fixed (attached) by welding, caulking, or the like by fitting the bearing portion 3f to the circular attachment hole formed at the upper position of the lid portion 2c from the outer surface side along the axial direction Fs. Moreover, after the fixed block portion 12 is assembled with the inner surface 2f of the lid portion 2c along the axial direction Fs and the plurality of convex portions 12p are inserted to the concave portions 2fc, the distal ends of the convex portions 12p are fixed by thermal deformation or the like. Furthermore, the cold rolled steel plate 12-1 and 12-2 of the fixed block portion 12 is inserted to the inner space of the driving coil 6 from the axial direction Fs, and the circuit component Pc is inserted to the component holding portion 14 from the axial direction Fs. In this way, the assembly of the lid portion 2c can be obtained.

On the other hand, as described above, the assembly of the movable body portion Sm may be integrally molded by insert molding and may be fabricated by an ordinary assembling method. In the case of the assembling method, the rotor yoke 7 is assembled with the rear surface of the movable block portion 13 which is a resin molded component from the axial direction Fs, and after that, the magnets 8af and 8bf are assembled from the surface side of the movable block portion 13 along the axial direction Fs. Moreover, the rotation shaft 4 is inserted and fixed to the movable block portion 13 from the axial direction Fs. In this way, the assembly of the movable body portion Sm can be obtained.

On the other hand, the bearing portion 3r is attached to the circular attachment hole formed at the upper position of the frame portion 2m from the inner surface side along the axial direction Fs. After that, the rotation shaft 4 of the movable body portion Sm is inserted to the bearing portion 3r from the rear end side from the axial direction Fs, and the front end side of the rotation shaft 4 is inserted to the bearing portion 3f fixed to the lid portion 2c from the inner surface side along the axial direction Fs. When four caulking piece portions 2mp that protrude from the frame portion 2m are bent (caulked) and the concave portions 2cp of the lid portion 2c are pressed and fixed, the rotary solenoid 1 according to the present embodiment illustrated in FIGS. 8 and 9 can be obtained.

When the rotary solenoid 1 is assembled (manufactured) in this manner, since the respective components can be assembled along the axial direction Fs, it is possible to realize full automation of the manufacturing steps extremely easily and to contribute to reduction in the manufacturing cost.

Therefore, the rotary solenoid 1 according to the present embodiment is constructed by a basic structure in which the fixed body portion Sc includes the driving coil 6 and the movable body portion Sm includes the rotor yoke 7 having one end 7s fixed to the rotation shaft 4 and the magnet mechanism portion 8 having the pair of magnets 8af and 8bf fixed to the opposing surface 7p positioned close to the other end 7t of the rotor yoke 7 serving as a surface opposing the driving coil 6 and disposed along the rotation direction Fr of the opposing surface 7p. Therefore, it is possible to eliminate an iron core which is a large component and to reduce the number of components. Moreover, by arranging the center of the driving coil 6 to be parallel to the center of the rotation shaft 4, a layout structure which can easily achieve a small size (a small thickness) can be obtained. Therefore, it is possible to easily realize reduction in the size (particularly, the thickness) of the entire rotary solenoid 1 and to contribute to reduction in the weight and the cost of the entire rotary solenoid 1.

Since the driving coil 6 is used, the inductance that is proportional to the permeability in the inner space of the driving coil 6 can be decreased to a very small value of several mH. As a result, since a very fast response speed can be realized in such a way that the current can be raised up to a saturation current substantially instantaneously when a driving voltage is applied, it is possible to realize fast operations and to contribute to improvement in productivity and processing speed of a target device in which the rotary solenoid 1 is used.

Figure 15:
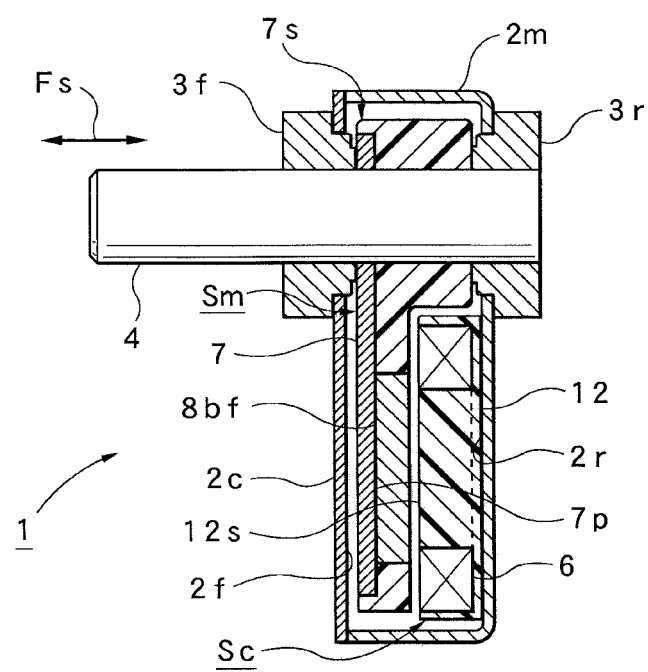
FIG. 15 is a cross-sectional side view illustrating a modification of the rotary solenoid.

FIG. 15 illustrates a modification of the rotary solenoid 1 according to the first embodiment. In the modification illustrated in FIG. 15, the arrangement of components is reversed in a front-to-rear relation along the axial direction Fs with respect to the rotary solenoid 1 illustrated in FIG. 9.

That is, in the embodiment illustrated in FIG. 9, the driving coil 6 is fixed to the inner surface 2f of the lid portion 2c which is on the front side, and the movable body portion Sm having the magnets 8af and 8bf is disposed on the rear side. Therefore, the movable body portion Sm is attracted toward the front side, and stress resulting from attraction acts on the bearing portion 3f on the front side. Due to this, it is necessary to increase the mechanical strength of the bearing portion 3f. On the other hand, the mechanical strength of the bearing portion 3r on the rear side can be suppressed to be low.

In contrast, in the modification illustrated in FIG. 15, the driving coil 6 is fixed to the inner surface 2r of the frame portion 2m which is on the rear side, and the movable body portion Sm having the magnets 8af and 8bf is disposed on the front side. Therefore, in this case, the movable body portion Sm is attracted toward the rear side and stress resulting from attraction acts on the bearing portion 3r on the rear side. Due to this, it is necessary to increase the mechanical strength of the bearing portion 3r on the rear side, and in this modification, the same component as the front-side bearing portion 3f is assembled with the rear-side bearing portion 3r. Although an inner-side stress is not applied to the front-side bearing portion 3f, an outer-side load as a working end is applied. Due to this, although this modification also cannot simplify the bearing portion 3f, a stress distribution can be equally distributed in a front-rear direction. The other detailed structure of FIG. 15 is the same as that of the embodiment illustrated in FIG. 9. Due to this, in the modification illustrated in FIG. 15, the same portions as those of FIG. 9 are denoted by the same reference numerals to clarify the configuration, and the detailed description thereof will be omitted.

Second Embodiment

Next, a rotary solenoid 1 according to a second embodiment will be described with reference to FIGS. 16 and 17.

The rotary solenoid 1 according to the second embodiment is the rotary solenoid 1 illustrated in FIG. 9 in which the fixed body portion Sc is formed by attaching the magnet mechanism portion 8 to the casing 2 and the movable body portion Sm is formed by attaching the driving coil 6 to the rotation shaft 4.

Specifically, the movable body portion Sm includes the driving coil 6 held by a movable block portion 13e, the rotation shaft 4 fixed to the movable block portion 13e and disposed to be arranged in parallel to the center of the driving coil 6, and an attracting piece 16 formed of a magnetic material fixed to a predetermined position of the movable block portion 13e. On the other hand, the fixed body portion Sc includes the casing 2 formed of a magnetic material and a magnet mechanism portion 8 having two sets of magnet portions 8a and 8b fixed to the inner surfaces 2f and 2r of the casing 2 and disposed to oppose an end in the axial direction Fs of the driving coil 6 so as to correspond to the first position Xa and the second position Xb of the movable body portion Sm.

With this configuration, the heavy magnet portions 8a and 8b are fixed to the inner surfaces 2f and 2r of the casing 2 serving as a fixed side and the relatively light driving coil 6 is supported by the rotation shaft 4 serving as a movable side. Therefore, it is possible to decrease an overall weight of the movable body portion Sm remarkably and to secure a fast response speed and a high output torque. Furthermore, since the magnets that form the magnet portions 8a and 8b are disposed on the inner surface of the casing 2 opposing the end in the axial direction Fs of the driving coil 6 supported by the rotation shaft 4, it is possible to increase the size of the magnet as long as the arrangement space of the inner surfaces 2f and 2r of the casing 2 is allowed. As a result, it is possible to realize overall downsizing of the rotary solenoid 1 while securing necessary performance.

Figure 16:
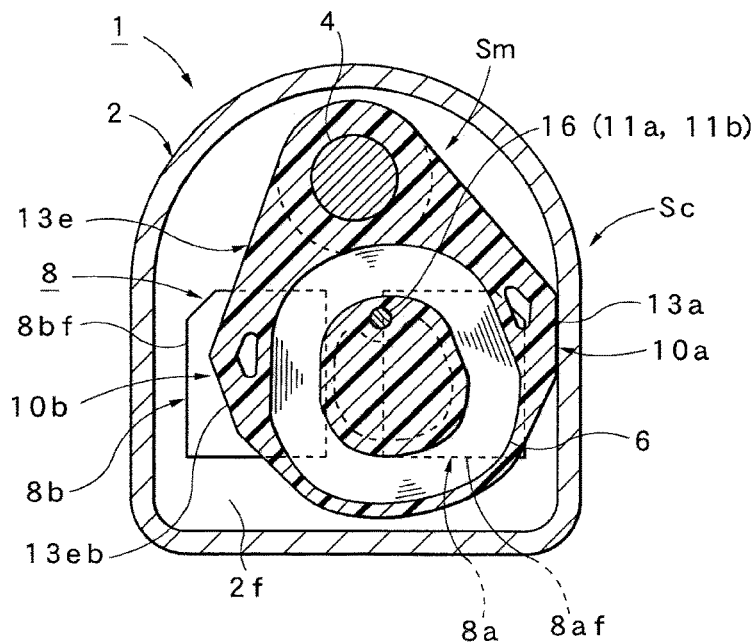
FIG. 16 is a cross-sectional rear view at the position of line D-D in FIG. 17, of a rotary solenoid according to a second embodiment of the present invention.
Figure 17:
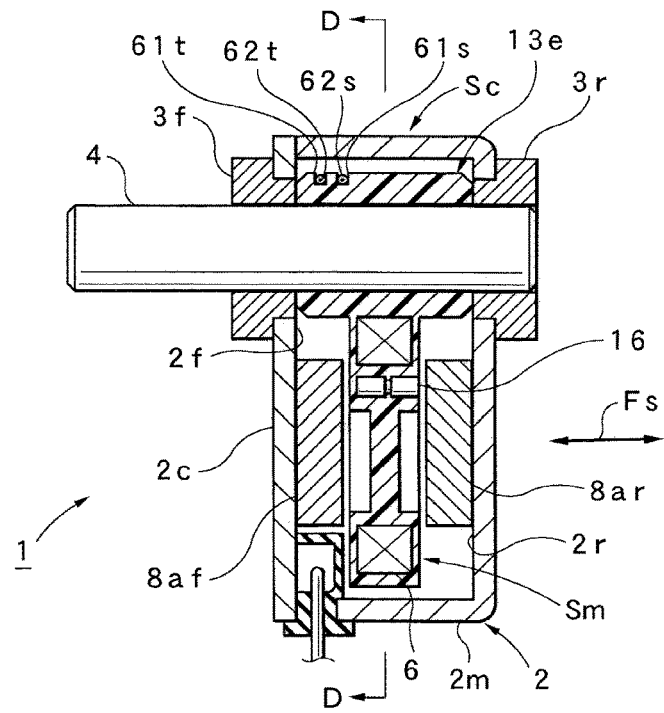
FIG. 17 is a cross-sectional side view of the rotary solenoid.
Figure 18:
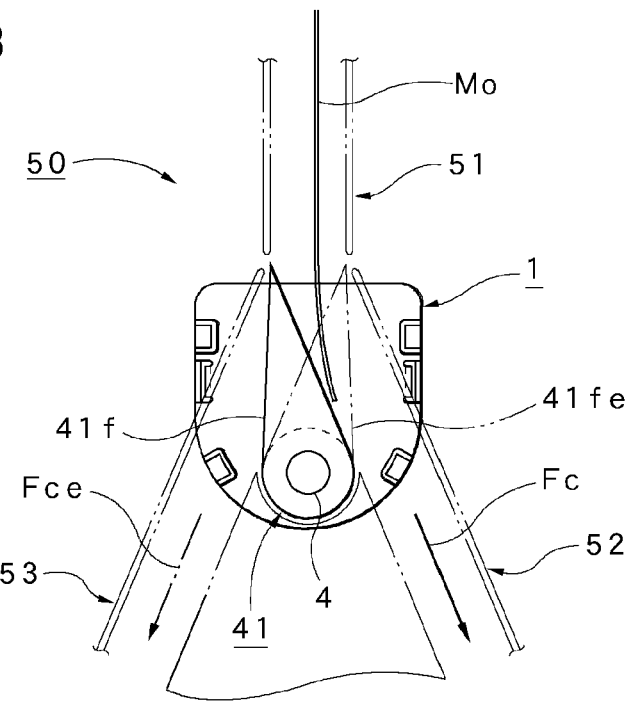
FIG. 18 is a schematic view of installation seen from a front side, illustrating a use example of the rotary solenoid according to the first and second embodiments of the present invention.
Figure 19:
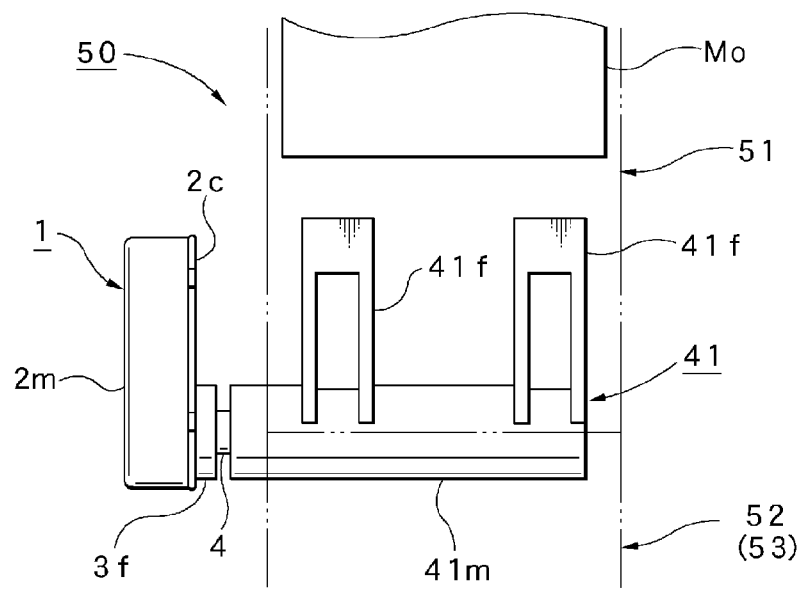
FIG. 19 is a schematic view of installation seen from a lateral side, illustrating a use example of the rotary solenoid.

The magnet mechanism portion 8 illustrated in FIGS. 16 and 17 is made up of the pair of magnets 8af and 8bf disposed on the inner surfaces 2f and 2r on both opposing sides of the casing 2, opposing both ends in the axial direction Fs of the driving coil 6 when forming the magnet portions 8a. That is, one magnet portion 8a is made up of a pair of magnets 8af and Bar opposing each other, and the other magnet portion 8b is made up of a pair of magnets 8bf and 8br opposing each other. Since the magnet 8br is fixed to the inner surface 2r of the casing 2 and is disposed to oppose the magnet 8af fixed to the inner surface 2f of the casing, the magnet 8br is not depicted in the drawing.

With this configuration, since the number of magnets is doubled as compared to a case in which the magnets 8af and 8bf are disposed on one inner surface 2f of the casing 2, the rotary solenoid 1 can be implemented as the best advantageous form from the viewpoint of securing the response speed, the output torque, the magnetic balance, and the stability of the rotary solenoid 1.

On the other hand, although not illustrated in the drawing, similarly to the first embodiment illustrated in FIG. 9, the magnet mechanism portion 8 may be made up of the single magnets 8af and 8bf disposed on one inner surface 2f (or 2r) of the casing 2 opposing one end in the axial direction Fs of the driving coil 6. In this case, since a minimum necessary number of components are used, the rotary solenoid can be implemented as the best advantageous form from the viewpoint of reducing the size and the cost of the rotary solenoid 1.

On the other hand, the attracting piece 16 and the magnet mechanism portion 8 (the magnet portions 8a and 8b) form the pair of self-holding mechanisms 11a and 11b by attraction of the magnet mechanism portion 8. In this case, a cross-section area vertical to the axial direction of the attracting piece 16 is preferably set to a range of 0.1 to 10[%] of the cross-sectional area vertical to the axial direction in the inner space of the driving coil 6. When the cross-sectional area is set in this manner, it is possible to realize a stable self-holding action reliably from the viewpoint of securing an attraction force (holding torque) necessary for obtaining a self-holding force during stopping and eliminating an unnecessary attraction force and to optimize the self-holding action easily.

In FIGS. 16 and 17, reference numeral 13ea indicates a restricting surface portion formed integrally with the movable block portion 13e that forms the restricting stopper mechanism 10a, and reference numeral 13eb indicates a restricting surface portion formed integrally with the movable block portion 13e that forms the restricting stopper mechanism 10b. Reference numerals 62s and 62t indicate a pair of lead wires drawn from the driving coil 6, and reference numerals 61s and 61t indicate holding slit portions formed in the movable block portion 13e holding the lead wires 62s and 62t. The other basic structure is similar to that of the rotary solenoid 1 illustrated in the first embodiment. Therefore, in FIGS. 16 and 17, the same portions (same functional portions) as those of FIGS. 8 and 9 will be denoted by the same reference numerals to clarify the configuration, and the detailed description thereof will be omitted.

Basic Operation and Use Method

Figure 14:
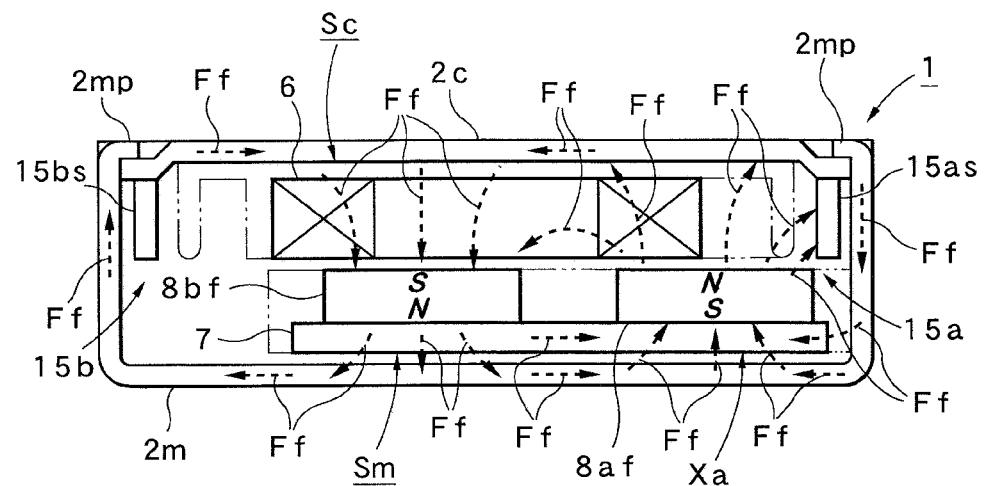
FIG. 14 is a diagram illustrating a distribution of magnetic lines of force when the rotary solenoid is stopped.

Next, a basic operation and a use method of the rotary solenoid 1 according to the first and second embodiments will be described with reference to FIGS. 1 to 7 (FIG. 14). FIGS. 1 to 7 (FIG. 14) illustrate a case in which the control method is applied to the rotary solenoid 1 of the first embodiment.

Figure 3:
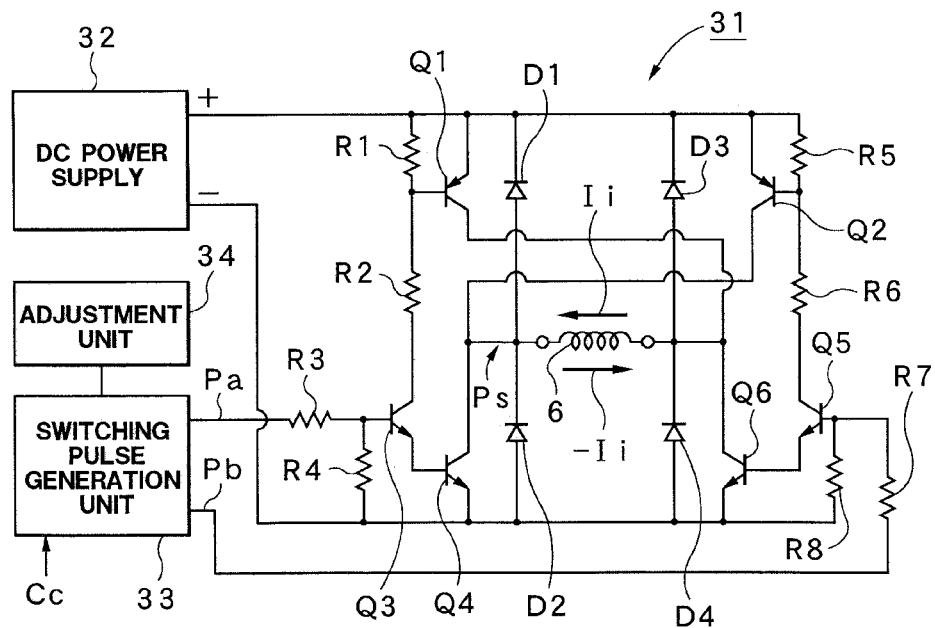
FIG. 3 is an electrical circuit diagram illustrating an example of a driving device that can implement the rotary solenoid drive control method.

FIG. 3 illustrates an example of a driving device 30 suitable for use in the rotary solenoid 1. In FIG. 3, reference numeral 6 indicates a driving coil, and in this case, includes a circuit component (a thermal fuse or the like) Pc. In the rotary solenoid 1, since two lead wires are led out from the driving coil 6, the lead wires are connected to the driving device 30. The driving device 30 includes a driving circuit 31 connected to two lead wires, a DC power supply 32 that supplies DC power (DC 24 [V]) to the driving circuit 31, and a switching pulse generation unit 33 that applies a first switching pulse Pa and a second switching pulse Pb to the driving circuit 31, and an adjustment unit 34 connected to the switching pulse generation unit 33 to adjust an OFF time (ending time) of the first and second switching pulses Pa and Pb.

The driving circuit 31 includes two PNP transistors Q1 and Q2, four NPN transistors Q3, Q4, Q5, and Q6, four diodes D1, D2, D3, and D4, and eight resistor elements R1, R2, R3, R4, . . . , and R8 and forms an electrical circuit by the wirings illustrated in FIG. 3. With this configuration, when a control signal (a control command) Cc is applied to the switching pulse generation unit 33, a first switching pulse Pa illustrated in FIG. 2(a) is applied to a base of the NPN transistor Q3, and a second switching pulse Pb illustrated in FIG. 2(b) is applied to a base of the NPN transistor Q5. As a result, a driving pulse Ps illustrated in FIG. 2(c) is applied across both ends of the driving coil 6. The driving pulse Ps has a waveform which, except for the magnitude, is identical to a pulse waveform obtained by combining the first switching pulse Pa and the second switching pulse Pb of which the positive and negative polarities are inverted.

Due to this, when the first switching pulse Pa is turned ON, a forward current Ii [A] flows into the driving coil 6. As a result, since the driving coil 6 is excited in a forward direction and an energization torque Tfd is generated by the Lorentz force due to the Fleming's left-hand rule, the movable body portion Sm starts rotating toward the first position Xa while overcoming a holding torque Tfc between the attracting piece portion 11bs and the magnet 8b at the second position Xa. After that, the energization torque Tfd increases and reaches the largest torque at a central position. When energization is continued, the movable body portion Sm is accelerated by the energization torque Tfd and reaches the first position Xa approximately at the highest speed. That is, the movable body portion Sm is switched to the first position Xa. Since the magnetic flux density decreases at the first position Xa due to the influence of a magnetic circuit, the magnitude of the energization torque Tfd also decreases.

On the other hand, when the second switching pulse Pb is turned ON, a backward current −Ii [A] flows into the driving coil 6. As a result, since the driving coil 6 is excited in a backward direction and the Lorentz force due to the Fleming's left-hand rule is generated, the movable body portion Sm is displaced toward the second position Xb and is switched to the second position Xb by an action similar to that of the case in which the movable body portion Sm is rotated toward the first position Xa.

In FIG. 14, magnetic lines of force Ff in the magnetic circuit when the forward current Ii disappears and the movable body portion Sm is stopped at the second position Xa by the self-holding function of the self-holding mechanism 11a are illustrated by dot-lines arrows.

In this case, magnetic lines of force Ff from the N pole of the magnet 8a pass through the inner space of the casing 2 and the lid portion 2c to reach the S pole of the other magnet 8b. The lid portion 2c includes the attracting piece portion 11as integrally formed with the lid portion 2c. Moreover, the magnetic lines of force Ff having passed through the inside of the lid portion 2c pass through the frame portion 2m and pass through the air gap between the frame portion 2m and the rotor yoke 7. After that, the magnetic lines of force Ff pass through the rotor yoke 7 to reach the S pole of the magnet 8a. On the other hand, the magnetic lines of force Ff from the N pole of the magnet 8b pass through the rotor yoke 7 to reach the S pole of the magnet 8a and pass through the air gap between the rotor yoke 7 and the frame portion 2m. After that, the magnetic lines of force Ff pass through the frame portion 2m and pass through the air gap between the frame portion 2m and the rotor yoke 7 from the frame portion 2m. After that, the magnetic lines of force Ff pass through the rotor yoke 7 to reach the S pole of the magnet 8a. Moreover, the magnetic lines of force Ff having passed through the frame portion 2m pass through the lid portion 2e to pass through the inner space of the casing 2 to reach the S pole of the magnet 8b.

In this manner, even when the driving coil 6 is not excited, the distal end in the rotation direction Fr of the magnet 8a and the attracting piece portion 11as approach at the shortest distance Ls (see FIG. 13) and the magnet 8a and the attracting piece portion 11as formed of a magnetic material attract each other. As illustrated in FIGS. 8 and 11, the position of the movable body portion Sm is restricted by the restricting stopper mechanism 10a. That is, the restricting surface portion 13a of the movable block portion 13 of the movable body portion Sm makes contact with the inner surface 2a of the casing 2 whereby the position thereof is restricted. As a result, the movable body portion Sm is held at the first position Xa by the restricting stopper mechanism 10a and the self-holding mechanism 11a. Similarly, when the movable body portion Sm is displaced to the second position Xb, the movable body portion Sm is held at the second position Xb by a similar action.

While a basic operation of the rotary solenoid 1 according to the first embodiment which uses the driving device 30 has been described, the illustrated driving device 30 can be used similarly in the rotary solenoid 1 according to the second embodiment.

Particularly, in the second embodiment, since the magnetic attraction force in the axial direction Fs can be decreased remarkably, friction between the bearing portions 3f and 3r and the movable body portion Sm can be reduced remarkably, and the movable body portion Sm can reach the first position Xa (or the second position Xb) quickly (smoothly) after the driving pulse Ps is canceled. Moreover, in the second embodiment, although a magnetic material is inserted in the inner space of the driving coil 6, when the cross-sectional area vertical to the axial direction of the attracting piece 16 is set to the range of 0.1 to 10[%] of the cross-sectional area vertical to the axial direction in the inner space of the driving coil 6, since increase in the inductance is approximately 50[%] at most, the driving coil can be regarded substantially as an air-cored coil as will be described later when this condition is satisfied.

On the other hand, the rotary solenoid 1 according to the first and second embodiments can be used as a two-position switching device illustrated in FIGS. 16 and 17 as an example of a use method.

FIGS. 16 and 17 illustrate an overview of a banknote sorting device 50 that sorts banknotes Mo conveyed along a conveying path 51 to a first passage 52 or a second passage 53. The banknote sorting device 50 has a configuration in which the rotary solenoid 1 is provided in a branch portion of three paths of the conveying path 51, the first entry passage 52, and the second entry passage 53, and a flapper unit 41 is provided in the rotation shaft 4 of the rotary solenoid 1. The flapper unit 41 is preferably formed as light as possible using a plastic material or the like. The flapper unit 41 includes a base portion 41m provided coaxially at the distal end of the rotation shaft 4 and a pair of flapper portions 41f provided to be separated in the axial direction of the base portion 41m.

Due to this, in FIG. 16, when the flapper portions 41f are switched to a position (the first position Xa) indicated by a solid line rotated in the counter-clockwise direction, since the conveying path 51 and the first entry passage 52 are connected, a banknote Mo conveyed along the conveying path 51 can enter the first entry passage 52 in the direction indicated by arrow Fc. When the flapper portions 41f are switched to a position (the second position Xb) indicated by an imaginary line rotated in the clockwise direction, since the conveying path 51 and the second entry passage 53 are connected, a banknote Mo conveyed along the conveying path 51 can enter the second entry passage 53 in the direction indicated by arrow Fce.

When the rotary solenoid 1 is used for switching the flapper unit 41 of the banknote sorting device 50, the rotary solenoid 1 needs to secure reliability in realizing stable and reliable switching based on a certain degree of output torque. Moreover, since the rotary solenoid 1 needs to be arranged in a limited installation space, it is necessary to realize a compact size as much as possible and to realize high-speed processing (fast operations) since it is necessary to increase the number of processed items as much as possible. Furthermore, since the rotary solenoid 1 uses electric power, it is necessary to reduce power consumption basically and to improve energy-saving properties and economic efficiency.

The rotary solenoid 1 according to the first and second embodiments can meet the demands by an approach in a mechanical structure and can meet the demands by an approach in a control method to be described later (that is, the drive control method according to the present invention).

Drive Control Method

Next, a drive control method according to the present invention suitable for use in the rotary solenoid 1 according to the first and second embodiments will be described with reference to FIGS. 1 to 7. FIGS. 1 to 7 illustrate a case in which the drive control method is applied to the rotary solenoid 1 of the first embodiment.

First, a conventionally general drive control method will be described in order to facilitate understanding of the drive control method according to the present invention.

Figure 4:
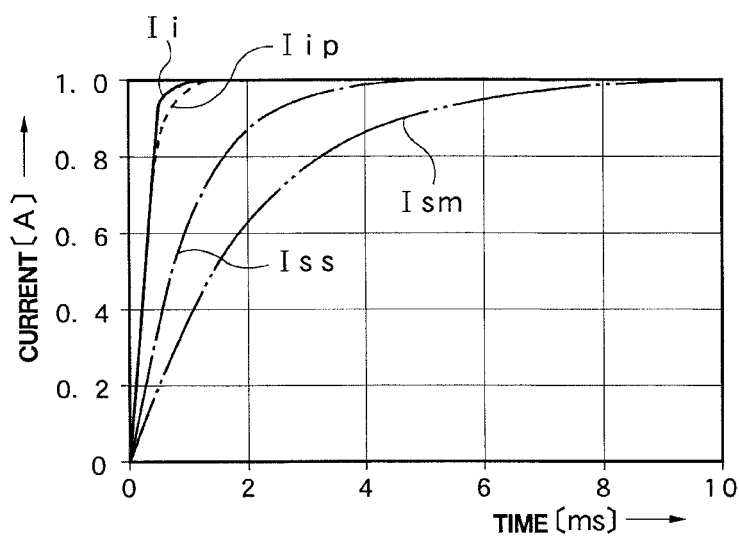
FIG. 4 is a diagram illustrating time-drive current characteristics including a comparative example when the rotary solenoid is driven by the driving device.

FIG. 4 illustrates the change characteristics of a forward current Ii [A] with respect to time [ms] when a positive-side pulse Pp of a driving pulse Ps illustrated in FIG. 2(c) is applied to the driving coil 6 by the first switching pulse Pa illustrated in FIG. 2(a). In the rotary solenoid 1 according to the first embodiment, since the fixed body portion Sc is formed using the driving coil 6, as described above, the inductance of the driving coil 6 can be set to a very small value of several mH proportional to the permeability in the inner space of the driving coil 6.

Therefore, a very fast response speed can be realized in such a way that the current can be raised up to a saturation current (in the illustrated example, 1.0 [A]) substantially instantaneously like the forward current Ii illustrated in FIG. 4 when a driving voltage based on the positive-side pulse Pp is applied.

In FIG. 4, a current characteristic curve when an iron plate is superimposed on the back surface of the driving coil 6 is indicated by Iip.

Moreover, a current characteristic curve when an iron core is inserted approximately to a half part of an air core portion of the driving coil 6 is indicated by Iss. Furthermore, a current characteristic curve when an iron core that fills the inner space is inserted into the inner side of the driving coil 6 is indicated by Ism. As understood from FIG. 4, particularly, the characteristic curve Iip provides characteristics equivalent to those of the characteristic curve from the viewpoint that a fast response speed is obtained. Therefore, the driving coil 6 which uses an air-cored coil is a concept including a case in which an iron plate is superimposed on the back surface of the air-cored coil as well as a case in which a magnetic material is not added to the air-cored coil.

In the case of the rotary solenoid 1 illustrated in FIGS. 16 and 17 according to the second embodiment, although the attracting piece 16 (an iron core) is inserted into the inner space of the driving coil 6, the inductance when a small iron core having an area occupying 10[%] or smaller of the area of the inner space is inserted is substantially equal to or smaller than the inductance when an iron plate is superimposed on the back surface of the air-cored coil. The current characteristic curve of this case is substantially the same as Iip. Therefore, the driving coil 6 can be regarded as the driving coil 6 which uses an air-cored coil as long as this condition is satisfied.

On the other hand, the energization period Tp of the positive-side pulse Pp is set in the following manner. An energization period Tr indicated by an imaginary line in FIG. 2(c) is a well-known general energization period and illustrates a case in which the rotary solenoid is energized in the entire rotation angle range Zm from the second position Xb to the first position Xa. Therefore, in this case, a drive control method based on so-called full energization control is realized such that the positive-side pulse Pp is applied, the movable body portion Sm at the second position Xb is rotated to reach the first position Xa, and application of the positive-side pulse Pp is stopped at a timing where the movable body portion Sm is stable.

Figure 2:
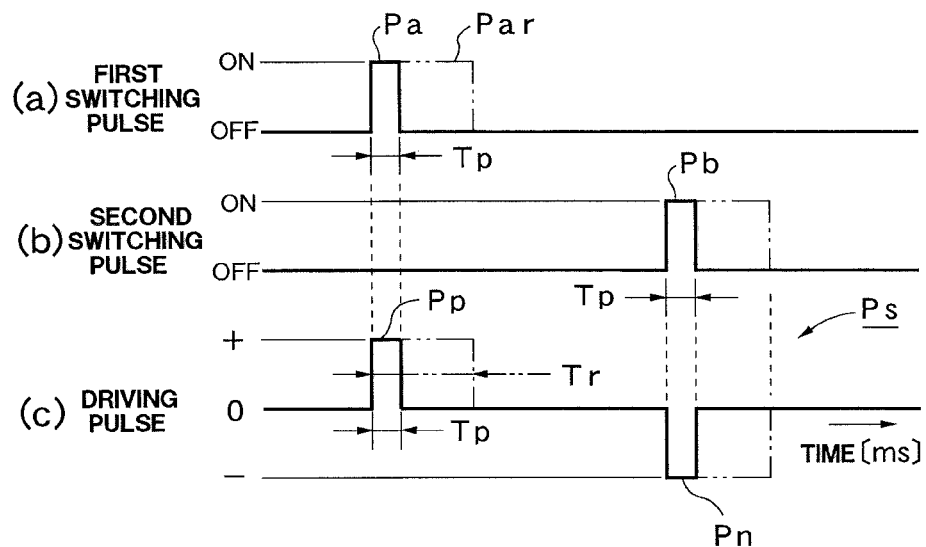
FIG. 2 is a signal waveform diagram of a control signal used for controlling driving of a driving device that can implement the rotary solenoid drive control method.

In contrast, the drive control method based on the present embodiment is a drive control method based on so-called initial energization control in which energization is controlled according to the time elapsed halfway. The energization period Tp of the positive-side pulse Pp indicated by a solid line in FIG. 2 is control that follows the drive control method based on the present invention. In this case, the energization period Tp is a period in which the positive-side pulse Pp is applied and the positive-side pulse Pp is turned OFF when the rotating position of the movable body portion Sm at the second position Xb reaches an intermediate position (specifically, an intermediate position (an intermediate timing) at which the movable body portion Sm is rotated from the second position Xb by 10 to 50[%] of the rotation angle range Zm when the rotation angle range Zm from the second position Xb to the first position Xa is 100[%]).

Figure 1:
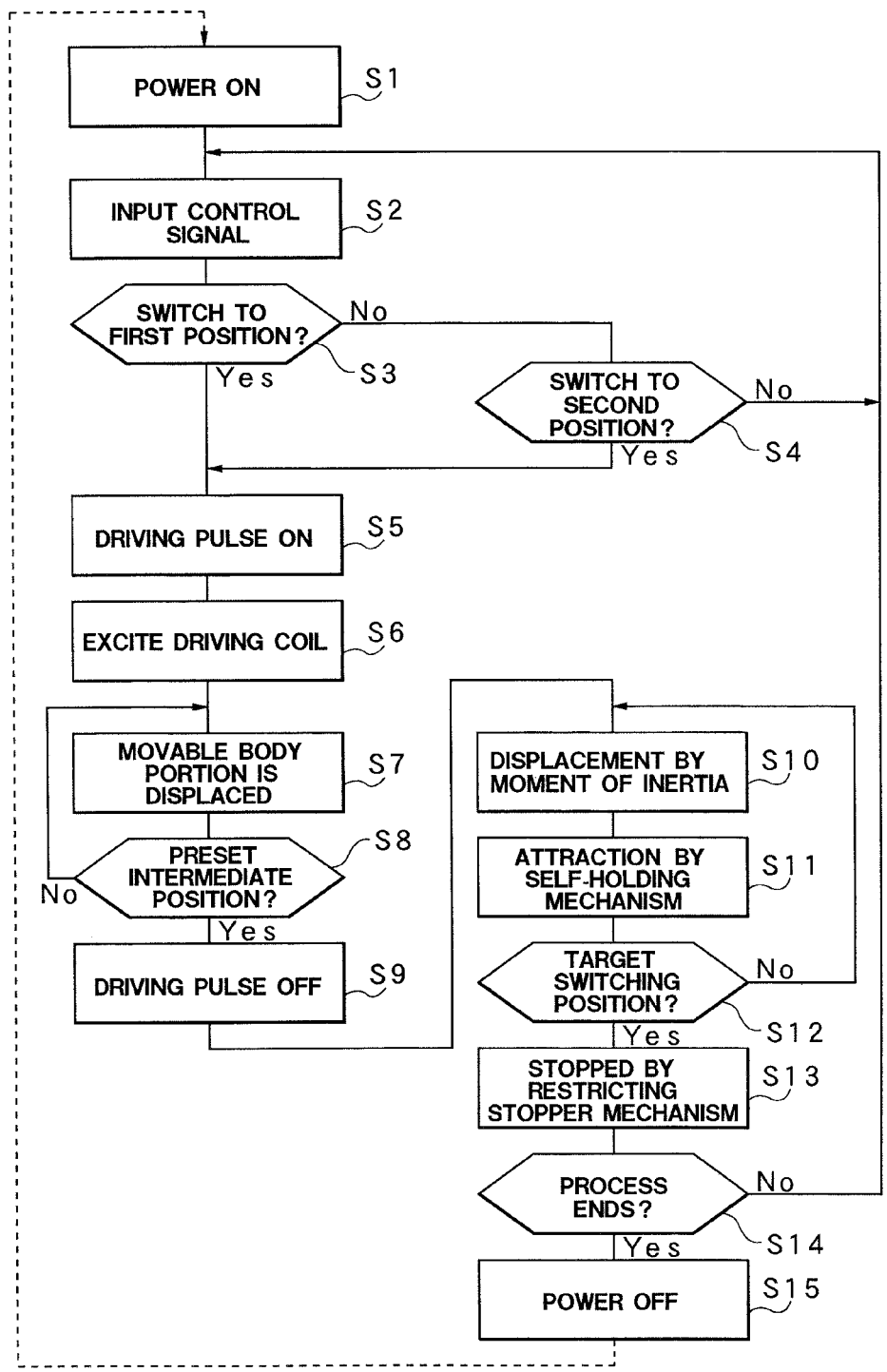
FIG. 1 is a flowchart for describing a rotary solenoid drive control method according to a first embodiment of the present invention.

Hereinafter, a specific drive control method according to the present embodiment will be described based on the flowchart illustrated in FIG. 1 by referring to FIGS. 2 to 7.

Figure 6:
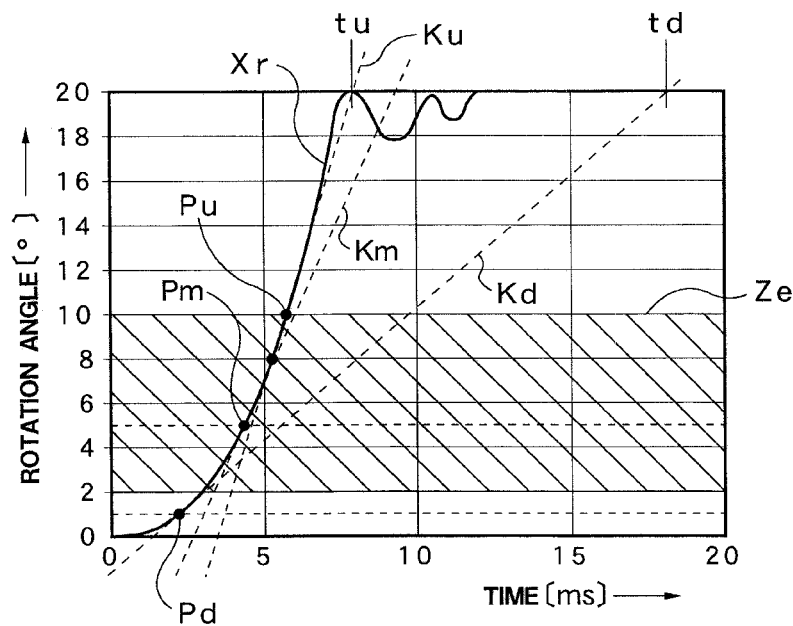
FIG. 6 is a diagram for describing the principle of the time-rotation angle characteristics of the movable body portion.
Figure 7:
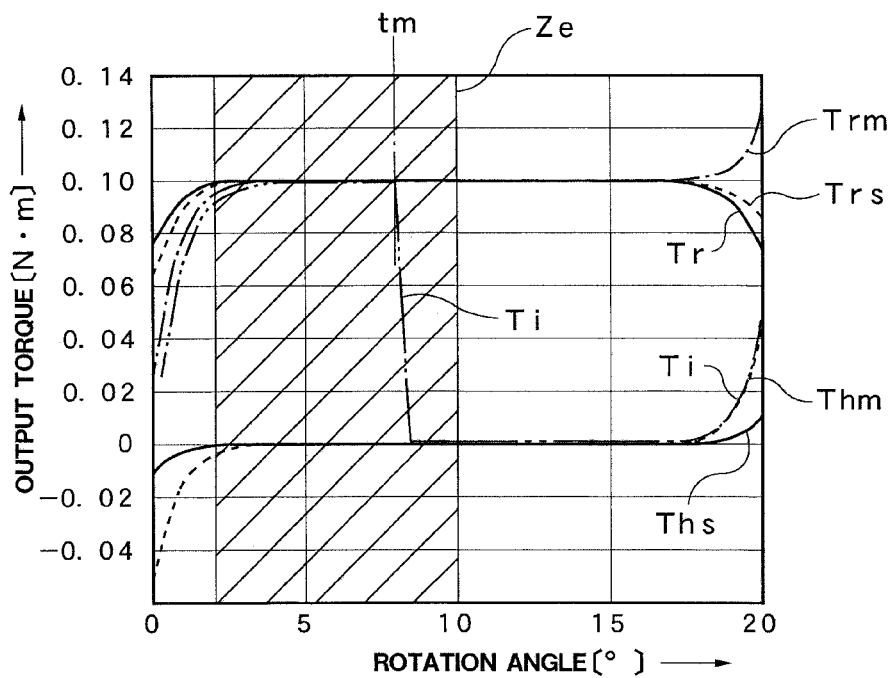
FIG. 7 is a diagram illustrating rotation angle-output torque characteristics of the movable body portion including a comparative example when the rotary solenoid is driven by the driving device.

FIG. 5 is a diagram illustrating the change characteristics of the rotation angle [O] of the movable body portion Sm with respect to time [ms] including a comparative example when the rotary solenoid 1 according to the present embodiment is driven by the driving device 30. FIG. 6 is a diagram for describing the principle of the change characteristics of the rotation angle [°] of the movable body portion Sm with respect to time [ms]. FIG. 7 is a diagram illustrating change characteristics of an output torque [N·m] with respect to the rotation angle [° ] when the movable body portion Sm is rotated.

First, a power switch (not illustrated) is turned ON (step S1). It is assumed that the movable body portion Sm of the rotary solenoid 1 stops at the second position Xb (that is, the movable body portion Sm is in a self-holding state at the second position Xb). Moreover, it is assumed that the control signal (control command) Cc illustrated in FIG. 3 is applied to the switching pulse generation unit 33 (step S2).

When the control signal Cc is applied, first, the first switching pulse Pa illustrated in FIG. 2(a) is applied to the base of the NPN transistor Q3 (step S3). In this way, a driving voltage based on the driving pulse Ps (the positive-side pulse Pp) illustrated in FIG. 2(c) is applied to the driving coil 6. As a result, the forward current Ii [A] is supplied to the driving coil 6, and the driving coil 6 is excited in a forward direction (steps S5 and S6). When the driving coil 6 is excited in the forward direction, since an energization torque Tfd is generated by the Lorentz force due to the Fleming's left-hand rule, the movable body portion Sm starts rotating toward the first position Xa while overcoming a holding torque Tfc between the attracting piece portion 11bs and the magnet 8b at the second position Xa (step S7).

In this way, the positive-side pulse Pp is turned OFF when the movable body portion reaches an intermediate position (that is, a predetermined intermediate position Px) between the second position Xb and the first position Xa like a change characteristic Xi indicated by a solid line in FIG. 5 (steps S8 and S9). A rotation angle at the illustrated intermediate position Px is approximately 4.3 [°], and the rotation angle range Zm is approximately 22[%]. This intermediate position Px corresponds to an energization period Tp which is approximately 4 [ms]. Even when the excitation of the driving coil 6 is stopped at the intermediate position Px, the movable body portion Sm continues rotating as it does due to the inertial force (moment of inertia) (step S10). Moreover, the movable body portion Sm is displaced to the first position Xa due to the attraction of the magnet 8a and the attracting piece portion 11as when the movable body portion Sm approaches the first position Xa (step S11). In this way, when the movable body portion Sm reaches the first position Xa, the displacement is restricted by the restricting stopper mechanism 10a, and the movable body portion Sm is attracted by the self-holding mechanism 11a and is stopped at the intended first position Xa (steps S12 and S13). The intermediate position may be detected directly by a sensor including switches and may be detected indirectly via the elapsed time or the like.

In this case, the movable body portion Sm performs linear displacement (that is, constant-speed movement) from the intermediate position. Px like the change characteristic Xi illustrated in FIG. 5. Therefore, even if the movable body portion Sm bounces a little at the first position Xa, the number and the magnitude of bounces decrease, and the movable body portion Sm is held at the first position Xa at approximately 13 [ms] as illustrated in FIG. 5. It is preferable that a period four times or longer the response time constant (in the illustrated example, 0.5 [ms]) of the current Ii is secured as the energization period Tp. In this way, since a current that is 98[%] or more of the saturation current can be secured, the movable body portion Sm can be accelerated as close as the largest torque.

A change characteristic Xr indicated by an imaginary line in FIG. 5 indicates a driving pulse when the conventionally general drive control is performed. In this case, since the driving coil 6 of the rotary solenoid 1 is excited by the full energization control (the energization period Tr in FIG. 2(c)), the movable body portion Sm is accelerated by a torque exceeding a holding torque Tfc based on the attraction of the attracting piece portion 11bs and the magnet 8b at the second position Xb, and the movable body portion Sm moves from the second position Xb to reach the first position Xa in approximately 8 [ms], bounces approximately twice repeatedly, and is self-held after approximately 12 [ms] as indicated by the change characteristic Xr indicated by an imaginary line in FIG. 5. In this case, a range in which the movable body portion Sm rotates is the rotation angle range Zm and is 20 [O] in the illustrated example. Moreover, after the movable body portion Sm reaches the first position Xa, excitation is stopped after elapse of approximately 20 [ms] in order to avoid burning of the driving coil 6, and after that, non-energization is maintained for a period of approximately 80 [ms] or more. The first switching pulse used for this full energization control is the imaginary line Par illustrated in FIG. 2(a).

In this case, the displacement of the movable body portion Sm is an accelerating displacement based on a quadric function like the channel Xr illustrated in FIG. 5. Due to this, when the movable body portion Sm reaches the first position Xa and the restricting surface portion 13a collides with the inner surface 2a, since a large bounce occurs, the movable body portion Sm enters a holding state at a time point at which this bounce is settled to some extent. Therefore, after the holding state is created, the positive-side pulse Pp is turned OFF after the elapse of a predetermined period. When the movable body portion Sm reaches the first position Xa, although the bounce is suppressed as much as possible by voltage suppression control, brake pulse-based control, or the like, a certain degree of bounce is inevitable.

When processing of installed devices and the like is continued, the driving pulse (the negative-side pulse Pn) illustrated in FIG. 2(c) is applied, and by the same action as the positive-side pulse Pp, the movable body portion Sm is displaced from the first position Xa to the second position Xb and is switched to the second position Xb, and the above-described operations are executed repeatedly (steps S14, S2, S3, S4, S5, and so on).

When all the intended operations end, the power switch is turned OFF (steps S14 and S15).

Even when the control method according to the present embodiment is performed in this manner, although the time taken for displacement of the movable body portion Sm does not change too much as compared to a case in which general full energization control is performed, the energization period Tp can be reduced approximately by ⅕ and power consumption can be reduced by ⅕.

In the illustrated example, since the response time constant of the current is 0.5 [ms], when the power consumption is reduced by ⅕, a temperature rise of the driving coil 6 is reduced by ⅕. Therefore, when the temperature rise of the driving coil 6 during full energization control where the energization period Tr is 20 [ms] (duty ratio: 20%) is 100 [° C.], a temperature rise of the driving coil 6 during initial energization control where the energization period Tp is 4 [ms] (duty ratio: 4%) is suppressed approximately to 20 [° C.].

If the temperature rise of the driving coil 6 can be suppressed to 20 [° C.], since a resistance rise remains at approximately 8[%], a trouble such as burning may not occur, a decrease in the output torque has a level so small as to be negligible, and the structure can be simplified. As for decrease in output torque, when the driving coil 6 is driven by a constant-voltage circuit and a temperature rise of the driving coil 6 is 100 [° C.], since the output torque is inversely proportional to a resistance, the resistance increases by 40[%] and the output torque is approximately 70[%].

A range of timings at which the first switching pulse Pa is turned OFF (canceled) is preferably set to a timing at which a rotation angle from the second position Xb reaches 10 to 50[%] of the rotation angle range Zm as illustrated in FIG. 6. In FIGS. 5 to 7, a selectable cancellation range Ze (that is, the range of 10 to 50[%]) is indicated by hatched lines.

In this case, when the rotation angle is smaller than 10[%], the influence of a self-holding force at the second position Xb serving as a starting position acts greatly and there is little margin for coping with load variations. When the rotation angle is equal to or larger than 50[%], since the driving coil 6 at the first position Xa is not excited, the self-holding force at the first pixel of interest Xa is small and the bounce increases. Therefore, the control approaches the full energization control at the rotation angle of 50[%] or larger, and as a result, the energization period increases. From the above-mentioned reasons, it is preferable that the rotation angle from the second pixel of interest Xb is selected from the range of 10 to 50[%]. In this way, it is possible to realize low power consumption, small impact, and low noise while avoiding decrease in a response speed.

In FIG. 6, Pd indicates a canceling position which occurs at a relative early stage and this canceling position Pd corresponds to approximately 5[%] of the rotation angle range Zm. When the positive-side pulse Pp is turned OFF at this canceling position Pd, the movable body portion Sm is displaced along a change characteristics line Kd which is a tangential line of a change characteristic curve Xr at the canceling position Pd. Therefore, an arrival time td at the first position Xa on an extension line of the change characteristic line Kd is approximately 18 [ms]. In this case, since the arrival time td is longer than an arrival time to (12 [ms]) during the full energization control illustrated in FIG. 5, the response speed decreases and the demand for fast operations cannot be met. Furthermore, the pulse is turned OFF before the original energization torque Tfd occurs.

Pu indicates a canceling position which occurs at a relatively late stage and this canceling position Pu corresponds to approximately 50[%] of the rotation angle range Zm. When the positive-side pulse Pp is turned OFF at this canceling position Pu, control is performed substantially similar to the full energization control (the change characteristics Xr). That is, the movable body portion Sm is displaced along a change characteristic line Ku which is a tangential line of the change characteristic curve Xr at the canceling position Pu. Therefore, an arrival time to at the first position Xa on an extension line of the change characteristic line Ku is approximately 8 [ms]. In this case, although control is similar to the full energization control, since collision occurs in a non-energized state at the first position, the stability may become worse. Pm indicates a canceling position located in the middle of the canceling positions Pd and Pu, and Km indicates a change characteristic line which is a tangential line at the canceling position Pm.

The holding torque Tfc generated by the attraction between the magnet 8a and the attracting piece portion 11as at the first position Xa can be set arbitrarily depending on the use or the like, when the control method according to the present embodiment is used, the holding torque Tfc is preferably set to 10 to 50[%] of the energization torque Tfd generated during energization of the driving coil 6. When the energization torque Tfd at the first position Xa is to be set to 50 to 80[%] of a central position where a largest torque (the energization torque Tfd) is generated, it is necessary to activate the driving coil reliably. Therefore, it is preferable to set the holding torque Tfc to 50[%] or smaller of the largest energization torque Tfd at the central position. Moreover, in order to avoid the influence of vibration or the like and to secure a reliable self-holding force in a non-energized state, the holding torque Tfc is preferably set to 10[%] or more of the energization torque Tfd.

FIG. 7 illustrates change characteristics when the holding torque Tfc is set to 10 [%] and 50[%]. In FIG. 7, Ti indicates change characteristics of an output torque (energization torque+holding torque) when the holding torque Tfc is set to 50[%] of the energization torque Tfd and the pulse is turned OFF in a setting range Ze of 10 to 50 [%]. FIG. 7 also illustrates, as a comparative example, change characteristics Tr when a holding torque based on the attracting piece portion 11as is not present and a general driving pulse corresponding to the characteristic curve Xr in FIG. 5 is applied over the entire period. FIG. 7 also illustrates change characteristics Ths of the holding torque when the holding torque is set to 10[%] of the torque generated during energization of the driving coil 5, and change characteristics Thm of the holding torque when the holding torque is set to 50[%] of the torque generated during energization of the driving coil 6. FIG. 7 also illustrates characteristics Trs which combine the change characteristics Tr and Ths and characteristics Tim which combine the change characteristics Tr and Thm.

While operations have been described mainly based on the positive-side pulse Pp, when the negative-side pulse Pn illustrated in FIG. 2(c) is applied to switch the movable body portion Sm at the first position Xa to the second position Xb, basic operations are the same as the case of the positive-side pulse Pp.

While the best mode embodiment has been described in detail, the present invention is not limited to such an embodiment, but arbitrary changes, additions, and omissions can occur in detailed configuration, shape, material, number and quantity, and method without departing from the gist of the present invention.

For example, although the first embodiment (including the modification) and the second embodiment have been illustrated as the rotary solenoid 1 to which the drive control method according to the present invention can be applied. However, the present invention is not limited to these embodiments but can be applied to various rotary solenoids.

Particularly, as a basic form, the present invention can be applied to various rotary solenoids 1 including: the fixed body portion Sc having the casing 2 in which the pair of bearing portions 3f and 3r positioned on front and rear sides are provided; and the movable body portion Sm having the rotation shaft 4 rotatably supported by the pair of bearing portions 3f and 3r, wherein the movable body portion Sm can reciprocate in the rotation angle range Zm between the first position X1 and the second position X2 by energization control of the driving coil 6 and can be stopped at the first position Xa and the second position Xb by the pair of self-holding mechanisms 11a and 11b by the restriction of the pair of restricting stopper mechanisms 10a and 10b and the attraction of the magnets 8a and 8b. The intermediate position Xp may be set directly by a specific position and may be set indirectly by a time corresponding to the position. Moreover, well-known stop control such as voltage suppression control, brake pulse-based control, or the like may be performed as necessary when the movable body portion Sm approaches a stopping position. On the other hand, a case in which the pair of restricting stopper mechanisms 10a and 10b that make contact with each other to restrict the rotation angle range Zm of the movable body portion Sm are shared by the fixed body portion Sc and the movable body portion Sm has been illustrated. However, the restricting stopper mechanisms 10a and 10b may be provided separately for the fixed body portion and the movable body portion and may be provided in the rotation shaft 4 protruding outward from the casing 2. Moreover, a case in which the movable block portion 13 formed of a non-magnetic material to hold the rotor yoke 7 and the magnet portion 8 by being fixed to the rotation shaft 4 is provided in the movable body portion Sm has been illustrated. However, the movable block portion 13 may not be used. Furthermore, a case in which the component holding portion 14 that holds one or two or more circuit components Pc connected to the driving coil 6 is provided in the fixed block portion 12 has been illustrated. However, the component holding portion 14 is optional. On the other hand, a case in which the self-holding mechanisms 11a and 11b that hold the position of the movable body portion Sm by attraction to the movable body portion Sm at both end positions Xa and Xb of the rotation angle range Zm are shared by the casing 2 has been illustrated. However, an additional component may be attached.

INDUSTRIAL APPLICABILITY

The drive control method according to the present invention can be used when controlling the driving of various rotary solenoids including controlling the driving of two-position switching actuators in various devices having various switching functions such as a function of sorting money, banknotes, and the like, a function of sorting postal matter, a function of switching a conveying path of printed materials, and an optical path switching function.

The invention claimed is:
1. A rotary solenoid drive control method for controlling driving of a rotary solenoid including:
 a fixed body portion having a casing in which a pair of bearing portions positioned on front and rear sides are provided; and
 a movable body portion having a rotation shaft rotatably supported by the pair of bearing portions, wherein
 the movable body portion is configured to reciprocate in a rotation angle range between a first position and a second position according to energization control of a driving coil and to be stopped at the first position and the second position by a pair of self-holding mechanisms by restriction of a pair of restricting stopper mechanisms and attraction of magnets, and when controlling switching from the second position (or the first position) to the first position (or the second position), after a driving voltage based on a driving pulse is applied to the driving coil, if the movable body portion has reached a predetermined intermediate position in 10 to 50[%] of the rotation angle range, control is performed so that application of the driving voltage is stopped.

2. The rotary solenoid drive control method according to claim 1, wherein the fixed body portion includes a casing formed of a magnetic material and a driving coil which uses an air-cored coil fixed to an inner surface of the casing, which is a surface orthogonal to an axial direction of the rotation shaft, and wherein the movable body portion includes a rotor yoke having one end fixed to the rotation shaft and a magnet mechanism portion having a pair of magnets fixed to an opposing surface positioned on the other end of the rotor yoke, which is a surface opposing the driving coil, and disposed along a rotation direction of the opposing surface.

3. The rotary solenoid drive control method according to claim 1, wherein the fixed body portion and the movable body portion share the restricting stopper mechanisms that make contact with each other to restrict the movable body portion.

4. The rotary solenoid drive control method according to claim 1, wherein the casing shares the self-holding mechanisms that attract the movable body portion at the first position and the second position.

5. The rotary solenoid drive control method according to claim 1, wherein the self-holding mechanism includes an attracting piece portion that protrudes from a portion of the casing.

6. The rotary solenoid drive control method according to claim 1, wherein the movable body portion includes a driving coil held by a movable block portion, the rotation shaft fixed to the movable block portion and disposed to be arranged in parallel to a center of the driving coil, and an attracting piece formed of a magnetic material and fixed to a predetermined position of the movable block portion, and wherein the fixed body portion includes a casing formed of a magnetic material, and a magnet mechanism portion having two sets of magnet portions fixed to inner surfaces of the casing, disposed to oppose an end in an axial direction of the driving coil, and disposed to correspond to the first position and the second position of the movable body portion.

7. The rotary solenoid drive control method according to claim 6, wherein the magnet portion is formed of a single magnet disposed on one inner surface of the casing, opposing one end in the axial direction of the driving coil.

8. The rotary solenoid drive control method according to claim 6, wherein the magnet portion is formed of a pair of magnets disposed on both opposing inner surfaces of the casing, opposing both ends in the axial direction of the driving coil.

9. The rotary solenoid drive control method according to claim 6, wherein a cross-sectional area vertical to an axial direction of the attracting piece is set to a range of 0.1 to 10[%] of a cross-sectional area vertical to an axial direction of an inner space of the driving coil.

10. The rotary solenoid drive control method according to claim 4, wherein the self-holding mechanism includes an attracting piece portion that protrudes from a portion of the casing.

* * * * *